US011904988B2

(12) United States Patent
Amma

(10) Patent No.: US 11,904,988 B2
(45) **Date of Patent: *Feb. 20, 2024**

(54) WATERCRAFT

(71) Applicant: YAMAHA HATSUDOKI KABUSHIKI KAISHA, Iwata (JP)

(72) Inventor: Hirofumi Amma, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 173 days.

This patent is subject to a terminal disclaimer.

(21) Appl. No.: 17/540,476

(22) Filed: Dec. 2, 2021

(65) Prior Publication Data

US 2022/0177088 A1 Jun. 9, 2022

(30) Foreign Application Priority Data

Dec. 8, 2020 (JP) ................................ 2020-203746

(51) Int. Cl.

| | |
|---|---|
| ***B63B 79/15*** | (2020.01) |
| ***B63B 34/10*** | (2020.01) |
| ***F02D 29/02*** | (2006.01) |
| ***B63H 21/21*** | (2006.01) |
| ***B63B 79/40*** | (2020.01) |

(52) U.S. Cl.

CPC .............. *B63B 79/15* (2020.01); *B63B 34/10* (2020.02); *B63B 79/40* (2020.01); *B63H 21/213* (2013.01); *F02D 29/02* (2013.01)

(58) Field of Classification Search

CPC ......... B63B 34/10; B63B 79/15; B63B 79/40; B63H 11/08; B63H 11/107; B63H 2011/081; B63H 21/213; F02D 29/02

See application file for complete search history.

(56) References Cited

U.S. PATENT DOCUMENTS

| | | | | |
|---|---|---|---|---|
| 5,683,275 A | 11/1997 | Nanami | | |
| 5,803,775 A | 9/1998 | Henmi | | |
| 6,230,642 B1 * | 5/2001 | McKenney ............ | G05G 9/047 | 114/144 R |
| 6,394,860 B1 * | 5/2002 | Nanami ............... | F02M 35/112 | 440/88 L |
| 6,685,515 B1 * | 2/2004 | Satoh ..................... | B63H 21/22 | 440/2 |
| 6,752,672 B2 * | 6/2004 | Kanno ................ | F02D 41/0087 | 440/1 |
| 6,790,107 B2 * | 9/2004 | Tanaka .................... | F01P 3/205 | 440/87 |

(Continued)

FOREIGN PATENT DOCUMENTS

| | | |
|---|---|---|
| JP | 01-262291 A | 10/1989 |
| JP | 08-040362 A | 2/1996 |

(Continued)

*Primary Examiner* — Carl C Staubach

(74) *Attorney, Agent, or Firm* — Keating & Bennett, LLP

(57) ABSTRACT

A watercraft includes a hull, an engine to generate power to propel the hull, an engine speed sensor to detect the rotation speed of the engine, and an ON/OFF sensor to be turned on and off according to a vertical acceleration of the hull. The watercraft further includes a controller configured or programmed to determine, based on at least one of a detection value of the ON/OFF sensor and a detection value of the engine speed sensor, whether or not a water surface is smooth.

11 Claims, 18 Drawing Sheets

(56) References Cited

U.S. PATENT DOCUMENTS

| | | | | |
|---|---|---|---|---|
| 6,899,578 | B2 * | 5/2005 | Nagafusa | F02B 61/045 440/87 |
| 6,904,864 | B2 * | 6/2005 | Re | B63B 23/40 114/368 |
| 7,494,390 | B2 * | 2/2009 | Mizutani | B63B 79/40 114/144 R |
| 8,142,241 | B2 * | 3/2012 | Kinoshita | B63H 11/02 440/38 |
| 8,171,869 | B2 * | 5/2012 | Ware | B63C 9/22 114/69 |
| 10,273,895 | B1 * | 4/2019 | Johri | F02D 41/065 |
| 2003/0054704 | A1 * | 3/2003 | Kanno | F02D 11/105 440/87 |
| 2007/0049139 | A1 * | 3/2007 | Mizutani | B63H 21/213 440/59 |
| 2008/0133075 | A1 | 6/2008 | St. Pierre et al. | |
| 2015/0066335 | A1 * | 3/2015 | Kishi | F02D 41/2416 701/103 |
| 2019/0300132 | A1 | 10/2019 | Kinomoto et al. | |
| 2022/0177087 | A1 * | 6/2022 | Amma | B63H 11/08 |

FOREIGN PATENT DOCUMENTS

| | | | |
|---|---|---|---|
| JP | 08-156884 | A | 6/1996 |
| JP | 2907291 | B2 | 6/1999 |
| JP | 2002-114193 | A | 4/2002 |
| JP | 2002-318115 | A | 10/2002 |
| JP | 2003-097309 | A | 4/2003 |
| JP | 2003-185743 | A | 7/2003 |
| JP | 2007-050823 | A | 3/2007 |
| JP | 3992101 | B2 | 10/2007 |
| JP | 2008-044472 | A | 2/2008 |
| JP | 2008-260315 | A | 10/2008 |
| JP | 2010-089550 | A | 4/2010 |
| JP | 2011-052577 | A | 3/2011 |
| JP | 4640760 | B2 | 3/2011 |
| JP | 5004120 | B2 | 8/2012 |
| JP | 2012-250565 | A | 12/2012 |
| JP | 5296736 | B2 | 9/2013 |
| JP | 5390453 | B2 | 1/2014 |
| JP | 5599480 | B2 | 10/2014 |
| JP | 2016-169968 | A | 9/2016 |
| JP | 2018-066350 | A | 4/2018 |

* cited by examiner

WATERCRAFT

CROSS REFERENCE TO RELATED APPLICATIONS

This application claims the benefit of priority to Japanese Patent Application No. 2020-203746 filed on Dec. 8, 2020. The entire contents of this application are hereby incorporated herein by reference.

BACKGROUND OF THE INVENTION

1. Field of the Invention

The present invention relates to a watercraft.

2. Description of the Related Art

US 2019/0300132 A1 discloses a personal watercraft as an exemplary watercraft. The personal watercraft disclosed in US 2019/0300132 A1 includes a trim actuator which pivots a deflector upward and downward to deflect upward and downward the flow of water jetted rearward from a nozzle.

SUMMARY OF THE INVENTION

The inventor of preferred embodiments of the present invention described and claimed in the present application conducted an extensive study and research regarding a watercraft, such as the one described above, and in doing so, discovered and first recognized new unique challenges and previously unrecognized possibilities for improvements as described in greater detail below.

The riding comfort of the watercraft differs depending upon whether the watercraft travels in waves or on smooth water, even if the speed of the watercraft is the same. By changing the settings (e.g., trim setting) of the watercraft according to the wave conditions, a good riding comfort is able to be provided. The personal watercraft disclosed in US 2019/0300132 A1 does not have the function of detecting the wave conditions. Therefore, an additional device such as a camera is required for the detection of the wave conditions.

In order to overcome the previously unrecognized and unsolved challenges described above, preferred embodiments of the present invention provide watercrafts that are each able to detect the wave conditions by utilizing existing sensors.

A preferred embodiment of the present invention provides a watercraft including a hull, an engine to generate power to propel the hull, an engine speed sensor to detect a rotation speed of the engine, an ON/OFF sensor to be turned on and off according to a vertical acceleration of the hull, and a controller configured or programmed to determine, based on at least one of a detection value of the ON/OFF sensor and a detection value of the engine speed sensor, whether or not a water surface is smooth.

With this structural arrangement, the rotation speed of the engine is detected by the engine speed sensor. When the watercraft travels forward in a rough water region in which the water surface is not smooth, a water resistance applied to the engine is liable to be repeatedly reduced and increased, thus repeatedly and suddenly increasing and reducing the rotation speed of the engine. When the watercraft travels forward in a smooth water region in which the water surface is smooth, the sudden increase and reduction in the rotation speed of the engine is less liable to occur.

The ON/OFF sensor is turned on and off according to the vertical acceleration of the hull. When the watercraft travels forward in the rough water region, the hull is liable to repeatedly experience instantaneous reciprocal upward and downward movement. At this time, a downward inertial force and an upward inertial force are often alternately applied to the ON/OFF sensor, such that the ON/OFF sensor is repeatedly turned on and off. When the watercraft travels forward in the smooth water region, the ON/OFF sensor is less liable to be repeatedly turned on and off.

Therefore, the controller is able to determine whether or not the water surface is smooth by monitoring at least one of the detection value of the ON/OFF sensor and the detection value of the engine speed sensor. Further, the engine speed sensor is an important sensor provided in watercrafts including engines. The ON/OFF sensor, such as a capsize sensor, is provided in most watercrafts. Therefore, the wave conditions are able to be determined by utilizing the existing sensors without providing an additional device such as a camera.

When the vertical acceleration of the hull is increased to apply a greater inertial force to the ON/OFF sensor, the ON/OFF sensor is switched from one of the ON and OFF state to the other of the ON and OFF state. The ON/OFF sensor has only two states, i.e., the ON state and the OFF state, and outputs rectangular waves. The ON/OFF sensor is able to detect whether or not the vertical acceleration of the hull exceeds an upper limit acceleration, but is not able to continuously detect the vertical acceleration of the hull. Therefore, the ON/OFF sensor is different from the acceleration sensor which continuously measures the vertical acceleration of the hull.

In a preferred embodiment of the present invention, the watercraft may additionally have at least one of the following features.

The controller may be configured or programmed to perform a first smooth water determination operation to determine, based on the detection value of the ON/OFF sensor, whether or not the water surface is smooth, and perform a second smooth water determination operation to determine, based on the detection value of the engine speed sensor, whether or not the water surface is smooth. The controller may be configured or programmed to determine that the water surface is not smooth when it is determined, in at least one of the first smooth water determination operation and the second smooth water determination operation, that the water surface is not smooth, and determine that the water surface is smooth when it is determined, in both of the first smooth water determination operation and the second smooth water determination operation, that the water surface is smooth.

With this structural arrangement, the controller performs the first smooth water determination operation to determine whether or not the water surface is smooth based on the detection value of the ON/OFF sensor without consideration of the detection value of the engine speed sensor. Further, the controller performs the second smooth water determination operation to determine whether or not the water surface is smooth based on the detection value of the engine speed sensor without consideration of the detection value of the ON/OFF sensor. Therefore, the reliability of the determination is improved as compared with a case in which only one of the first smooth water determination operation and the second smooth water determination operation is performed. Further, the determination method is simplified as compared with a case in which the determination on whether or not the water surface is smooth is based on both of the detection values.

Depending upon the wave conditions and the like, it is sometimes incorrectly determined that the water surface is smooth in one of the first smooth water determination operation and the second smooth water determination operation when the actual water surface is not smooth. When it is determined, in at least one of the first smooth water determination operation and the second smooth water determination operation, that the water surface is not smooth, the controller finally determines that the water surface is not smooth. Therefore, the controller is able to more reliably determine that the water surface is not smooth.

When the actual water surface is smooth, it is determined, in both of the first smooth water determination operation and the second smooth water determination operation, that the water surface is smooth. The controller does not finally determine that the water surface is smooth if it is determined, in only one of the first smooth water determination operation and the second smooth water determination operation, that the water surface is smooth, but finally determines that the water surface is smooth only when it is determined, in both of the first smooth water determination operation and the second smooth water determination operation, that the water surface is smooth. Therefore, the controller is prevented from incorrectly determining that the water surface is smooth in spite of the fact that the actual water surface is not smooth.

The controller may be configured or programmed to determine whether the watercraft speed is not lower than the lower limit speed and, if it is determined that the watercraft speed is lower than the lower limit speed, determine that the water surface is smooth.

With this structural arrangement, even if the actual water surface is not smooth when the controller determines that the watercraft travels forward at a low speed, the controller determines that the water surface is smooth. When the watercraft travels forward at a low speed, the riding comfort of the watercraft is less liable to be influenced by the wave conditions than when the watercraft travels forward at a high speed. This makes it possible to simplify the determination method of determining whether or not the water surface is smooth, while preventing or minimizing deterioration in riding comfort.

The watercraft may further include an acceleration operator which is movable in a range from a minimum output position to a maximum output position and is operated when the output of the engine is to be changed, and an acceleration operator position sensor to detect the position of the acceleration operator. In this case, the controller may be configured or programmed to determine, based on the detection value of the acceleration operator position sensor, whether or not the acceleration operator is held within a constant speed traveling range between the maximum output position and the minimum output position. The controller may be configured or programmed to determine, based on the detection value of the engine speed sensor, whether or not the water surface is smooth when it is determined that the acceleration operator is held within the constant speed traveling range.

With this structural arrangement, the position of the acceleration operator operated by the watercraft rider is detected by the acceleration operator position sensor. If the watercraft rider holds the acceleration operator at a constant position or practically does not move the acceleration operator, the controller determines that the acceleration operator is held within the constant speed traveling range. Only when this determination is made, the controller determines, based on the detection value of the engine speed sensor, whether or not the water surface is smooth. This prevents the controller from making an incorrect determination that the water surface is not smooth, which is attributable to a sudden change in the rotation speed of the engine when the acceleration operator is operated.

The controller may be configured or programmed to determine that the water surface is smooth when it is determined that the acceleration operator is not held within the constant speed traveling range.

With this structural arrangement, when the watercraft rider intentionally but significantly moves the acceleration operator, the controller determines that the acceleration operator is not held within the constant speed traveling range, and determines that the water surface is smooth. When the watercraft rider suddenly moves the acceleration operator, the rotation speed of the engine is suddenly changed. In this case, the controller cannot determine whether the sudden change in rotation speed is attributable to the operation of the acceleration operator or to the wave conditions, and sometimes incorrectly determines that the water surface is not smooth, in spite of the fact that the water surface is calm. When the determination that the water surface is smooth is made when it is determined that the acceleration operator is not held within the constant speed traveling range, the incorrect determination is avoided.

The controller may be configured or programmed to increase a width of the constant speed traveling range as the rotation speed of the engine increases.

With this structural arrangement, the determination on whether or not the watercraft rider intentionally moves the acceleration operator is based on the constant speed traveling range, and the width of the constant speed traveling range is increased as the rotation speed of the engine increases. Even if the watercraft travels forward in the smooth water region, the watercraft is liable to vibrate during the forward traveling of the watercraft. Due to the vibrations of the watercraft, the watercraft rider often slightly moves the acceleration operator. The movement of the acceleration operator is liable to be increased as the rotation speed of the engine increases. Therefore, the width of the constant speed traveling range is increased with the increase in the rotation speed of the engine to reduce the possibility that the controller incorrectly determines, due to the movement of the acceleration operator, that the watercraft does not travel forward at a constant speed.

The controller may be configured or programmed to determine whether or not the water surface is smooth based on whether or not the number of ON/OFF times in which the ON/OFF sensor is reciprocally switched between ON and OFF exceeds an upper limit value within a predetermined period of time.

With this structural arrangement, the controller does not determine that the water surface is not smooth immediately after the ON/OFF sensor is turned on and off, but counts the number of ON/OFF times in which the ON/OFF sensor is reciprocally switched between ON and OFF. Only when the number of ON/OFF times exceeds the upper limit value within the predetermined period of time, the controller determines that the water surface is not smooth. Therefore, when the ON/OFF sensor is accidentally turned on and off only once, the controller is prevented from determining that the water surface is not smooth. Further, the determination on whether or not the water surface is smooth is more reliably made in consideration of not only the number of ON/OFF times but also the period of time.

The controller may be configured or programmed to calculate the change rate of the rotation speed of the engine based on the detection value of the engine speed sensor, and determine, based on the calculated change rate, whether or not the water surface is smooth.

With this structural arrangement, the change rate of the rotation speed of the engine, i.e., the acceleration of the engine, is calculated, and the change in the acceleration of the engine is monitored. When the rotation speed of the engine is suddenly changed, the absolute value of the acceleration of the engine is increased. When only the change in the rotation speed of the engine is monitored, on the other hand, it is impossible to determine whether or not the rotation speed of the engine is changed in a short period of time. Therefore, the sudden change in the rotation speed of the engine is reliably detected by monitoring the change in the acceleration of the engine.

The controller may be configured or programmed to determine whether or not the water surface is smooth based on whether or not the change rate of the rotation speed of the engine is maintained within a normal traveling range, and increase the width of the normal traveling range as the rotation speed of the engine increases.

With this structural arrangement, the determination on whether or not the water surface is smooth is made based on whether or not the acceleration of the engine (the change rate of the rotation speed of the engine) is maintained within the normal traveling range. Further, the width of the normal traveling range is increased as the rotation speed of the engine increases. Even with the position of the acceleration operator kept unchanged, the rotation speed of the engine is sometimes fluctuated due to factors other than the wave conditions (e.g., due to uneven combustion or occurrence of cavitation). The fluctuation tends to be increased as the rotation speed of the engine increases. In addition, the fluctuation is often smaller than the fluctuation in the rotation speed of the engine occurring when the watercraft travels forward in a rough water region. Therefore, the width of the normal traveling range is increased with the increase in the rotation speed of the engine, thus preventing the incorrect determination that the water surface is not smooth.

The ON/OFF sensor may be a capsize sensor which is turned on and off according to the vertical acceleration of the hull, and is switched from one of an ON and OFF state to the other of the ON and OFF state when the hull is capsized.

With this structural arrangement, the capsize sensor is used as the ON/OFF sensor. When the hull is capsized, the capsize sensor is switched to the ON state or the OFF state. When the capsize sensor is continuously maintained in the ON state or the OFF state, the controller determines that the hull is capsized. The capsize sensor is provided in most watercrafts. Therefore, the wave conditions are able to be determined by using the capsize sensor without provision of an additional device such as a camera.

Another preferred embodiment of the present invention provides a watercraft including a hull, a prime motor to generate power to propel the hull, an ON/OFF sensor to be turned on and off according to a vertical acceleration of the hull, and a controller configured or programmed to determine, based on a detection value of the ON/OFF sensor, whether or not a water surface is smooth.

With this structural arrangement, the ON/OFF sensor is turned on and off according to the vertical acceleration of the hull. When the watercraft travels forward in a rough water region in which the water surface is not smooth, a downward force and an upward force are often alternately applied to the hull, such that the hull is liable to repeatedly experience instantaneous reciprocal upward and downward movement. At this time, the ON/OFF sensor is repeatedly turned on and off. When the watercraft travels forward in a smooth water region in which the water surface is smooth, the ON/OFF sensor is less liable to be repeatedly turned on and off. Therefore, the controller is able to determine whether or not the water surface is smooth by monitoring the detection value of the ON/OFF sensor. Further, the ON/OFF sensor, such as a capsize sensor, is provided in most watercrafts. Therefore, the wave conditions are able to be determined by utilizing the existing sensor without providing an additional device such as a camera.

Another preferred embodiment of the present invention provides a watercraft including a hull, an engine to generate power to propel the hull, an engine speed sensor to detect a rotation speed of the engine, and a controller configured or programmed to determine, based on a detection value of the engine speed sensor, whether or not a water surface is smooth.

With this structural arrangement, the rotation speed of the engine is detected by the engine speed sensor. When the watercraft travels forward in a rough water region in which the water surface is not smooth, a water resistance applied to the engine is liable to be repeatedly reduced and increased, thus repeatedly and suddenly increasing and reducing the rotation speed of the engine. When the watercraft travels forward in a smooth water region in which the water surface is smooth, the sudden increase and reduction in the rotation speed of the engine is less liable to occur. Therefore, the controller is able to determine whether or not the water surface is smooth by monitoring the detection value of the engine speed sensor. Further, the engine speed sensor is an important sensor provided in watercrafts including engines. Therefore, the wave conditions are able to be determined by utilizing the existing sensor without providing an additional device such as a camera.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
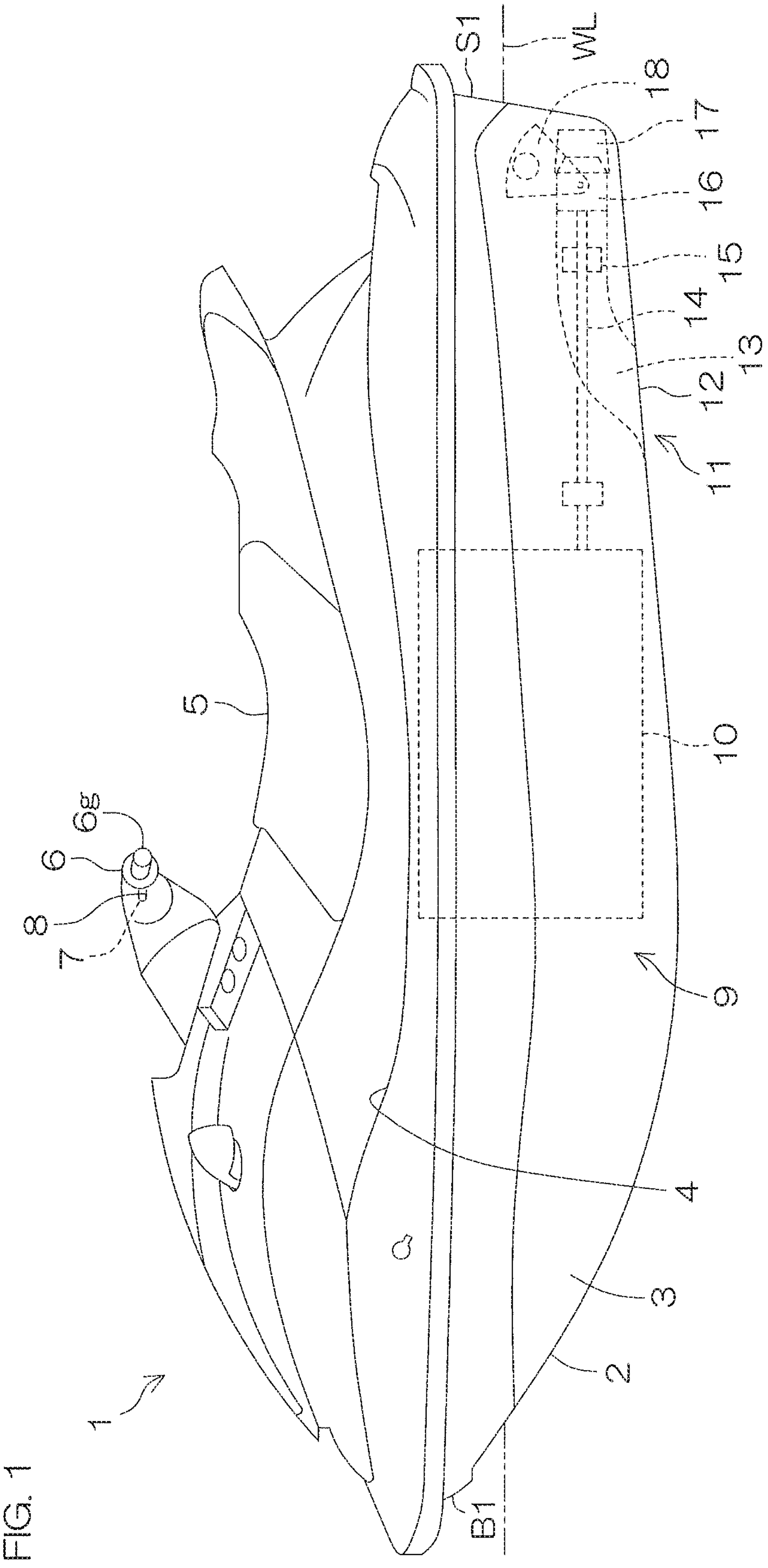
FIG. 1 is a left side view of a watercraft according to a preferred embodiment of the present invention.
Figure 2:
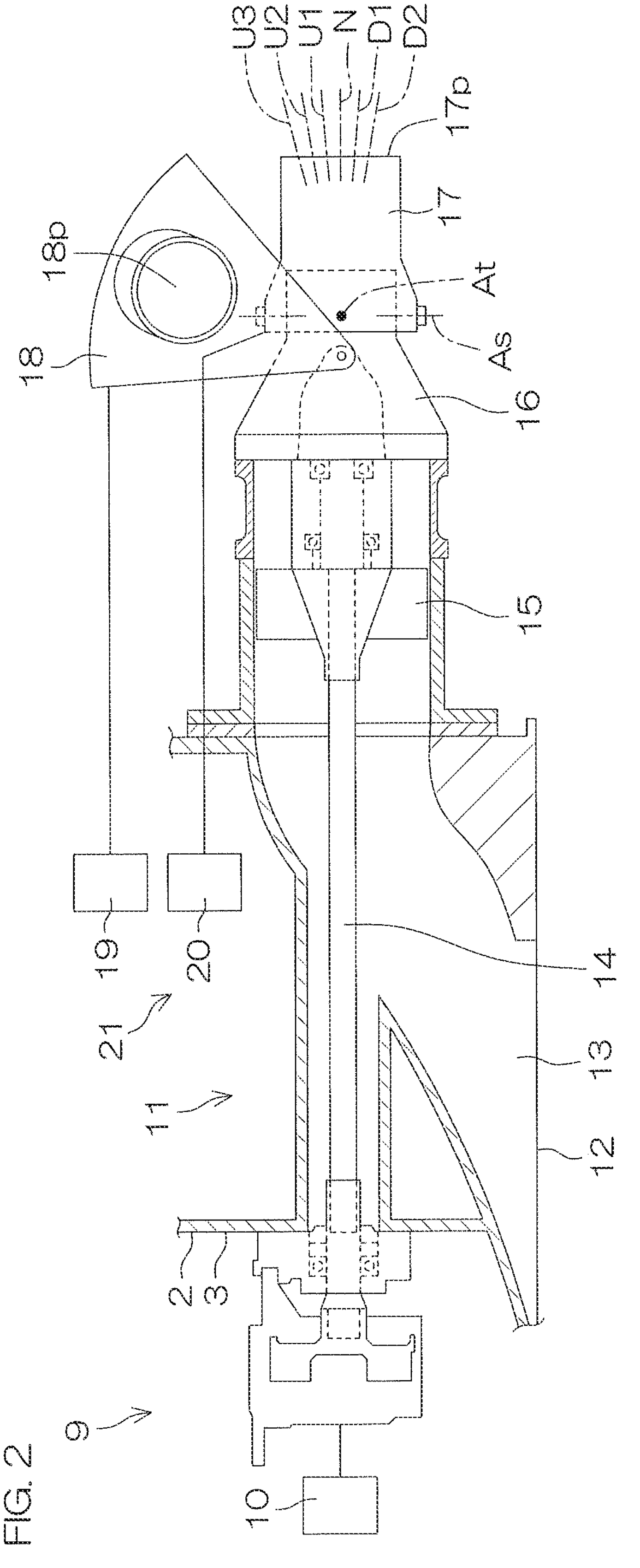
FIG. 2 is a sectional view illustrating a vertical section of a propulsion system provided in the watercraft.
Figure 3:
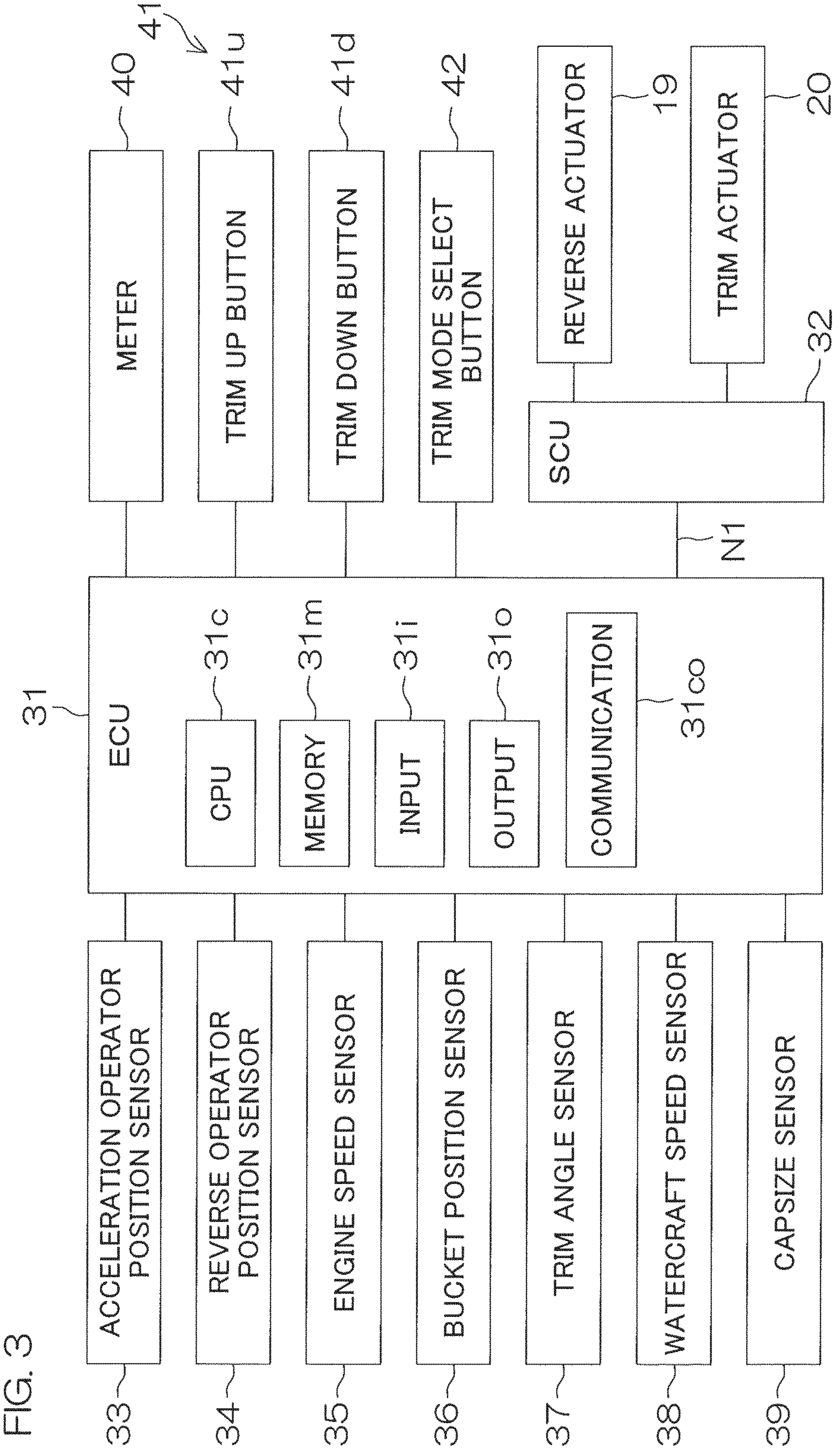
FIG. 3 is a block diagram of the watercraft.

FIG. 1 is a left side view of a watercraft 1 according to a preferred embodiment of the present invention. FIG. 2 is a sectional view illustrating a vertical section of a propulsion system 9 provided in the watercraft 1. FIG. 3 is a block diagram of the watercraft 1. FIG. 1 illustrates a personal watercraft as an example of the watercraft 1.

As shown in FIG. 1, the watercraft 1 includes a watercraft body 2 which floats on a water surface, and a propulsion system 9 which propels the watercraft body 2. The watercraft body 2 includes a hull 3 defining a watercraft bottom, and a deck 4 disposed above the hull 3. The propulsion system 9 is disposed in the watercraft body 2. The propulsion system 9 is, for example, a jet propulsion system which jets water sucked from the watercraft bottom rearward to generate a propulsive force.

The watercraft 1 includes a seat 5 on which a watercraft rider sits, and a steering operator 6 which is operated by the watercraft rider to steer the watercraft 1. The seat 5 may be single-seated, double-seated, or triple-seated. The watercraft 1 further includes an acceleration operator 7 which is operated by the watercraft rider to change the magnitude of the propulsive force generated by the propulsion system 9 to advance the watercraft body 2, and a reverse operator 8 which is operated by the watercraft rider to change the magnitude of the propulsive force generated by the propulsion system 9 to reverse the watercraft body 2.

In the present preferred embodiment, the steering operator 6 is a steering handle in the form of a bar handle. That is, the steering operator 6 includes two handle grips 6*g* which are respectively gripped by the right and left hands of the watercraft rider, and a handle bar having opposite ends to which the two handle grips 6*g* are respectively attached. The steering operator 6 is rotatable about a steering shaft extending downward and forward from the steering operator 6 in rightward and leftward directions with respect to the watercraft body 2. The acceleration operator 7 and the reverse operator 8 are rotatable together with the steering operator 6 in the rightward and leftward directions with respect to the watercraft body 2.

The acceleration operator 7 and the reverse operator 8 are attached to the steering operator 6. The acceleration operator 7 is disposed forward of the right handle grip 6*g*. The reverse operator 8 is disposed forward of the left handle grip 6*g*. In the present preferred embodiment, the acceleration operator 7 is an acceleration lever which is pivotal anteroposteriorly with respect to the steering operator 6. In the present preferred embodiment, the reverse operator 8 is a reverse lever which is pivotal anteroposteriorly with respect to the steering operator 6.

The acceleration operator 7 is movable in a range from a maximum output position to a minimum output position with respect to the steering operator 6. The maximum output position corresponds to the maximum output of an engine 10. The minimum output position corresponds to the minimum output of the engine 10. The minimum output position is an engine idling position at which the engine 10 is idled. The acceleration operator 7 is maintained at the minimum output position in the absence of the rider's operation. The output of the engine 10 increases as the acceleration operator 7 approaches the maximum output position.

As shown in FIG. 2, the propulsion system 9 includes a jet propulsion pump 11 which jets the water sucked from the watercraft bottom rearward to generate the propulsive force, and the engine 10 which drives the jet propulsion pump 11. The jet propulsion pump 11 includes a water inlet port 12 which opens in the watercraft bottom, a nozzle 16 from which the water sucked through the water inlet port 12 is jetted rearward, and a flow channel 13 through which the water is guided from the water inlet port 12 to the nozzle 16. The jet propulsion pump 11 further includes an impeller 15 disposed in the flow channel 13, and a drive shaft 14 which transmits the rotation of the engine 10 to the impeller 15.

The propulsion system 9 includes a deflector 17 which deflects the water jetted rearward from the nozzle 16 in the leftward and rightward directions. The water supplied from the nozzle 16 is jetted rearward from a jet port 17*p* of the deflector 17, such that the deflector 17 forms a straight water stream jetted from the jet port 17*p*. The deflector 17 is pivotal leftward and rightward with respect to the nozzle 16.

The nozzle 16 is fixed to the hull 3. With the deflector 17 tilted leftward or rightward with respect to the nozzle 16, the water jetted rearward from the deflector 17 is deflected leftward or rightward with respect to the nozzle 16. Thus, the propulsive force is generated so as to turn the watercraft 1.

When the watercraft rider moves the steering operator 6, the deflector 17 is pivoted leftward or rightward with respect to the nozzle 16. The watercraft 1 may include a push/pull cable which transmits the movement of the steering operator 6 to the deflector 17. The watercraft 1 may include, instead of the push/pull cable, a steering actuator which pivots the deflector 17 leftward and rightward with respect to the nozzle 16 based on the detection value of a steering position sensor to detect the position of the steering operator 6.

The propulsion system 9 includes a bucket 18 which changes the direction of the water jetted rearward from the deflector 17 to the forward direction. The bucket 18 includes jet ports 18*p* through which the water jetted rearward from the deflector 17 is jetted forward. The bucket 18 is attached to the nozzle 16. The bucket 18 is pivotal within a range from an F-position (which is a position shown in FIG. 2) to an R-position with respect to the nozzle 16. At the F-position, the bucket 18 does not overlap any portion of the jet port 17*p* of the deflector 17 as viewed from behind. At the R-position, the bucket 18 is located behind the jet port 17*p* of the deflector 17, and completely overlaps the jet port 17*p* of the deflector 17 as viewed from behind.

The propulsion system 9 includes a reverse actuator 19 which pivots the bucket 18 upward and downward within the range between the F-position and the R-position. The reverse actuator 19 includes an electric motor. The reverse actuator 19 may be an actuator including a power source other than the electric motor. The reverse actuator 19 is connected to an ECU 31 to be described below. When the watercraft rider operates the reverse operator 8, the ECU 31 controls the reverse actuator 19 to move the bucket 18 such that the bucket 18 is located at a position corresponding to the position of the reverse operator 8.

When the water is jetted rearward from the deflector 17 with the bucket 18 located at the F-position, the jetted water is not hindered by the bucket 18, but flows rearward. Thus, the propulsive force is generated so as to advance the watercraft 1. When the water is jetted rearward from the deflector 17 with the bucket 18 located at the R-position, the jetted water hits the bucket 18, and flows forward from the jet ports 18*p* of the bucket 18. Thus, the propulsive force is generated so as to reverse the watercraft 1.

The deflector 17 is pivotal about a vertical steering axis $A_s$ leftward and rightward with respect to the nozzle 16, and is pivotal about a horizontal trim axis $A_t$ upward and downward with respect to the nozzle 16. When the deflector 17 is tilted upward or downward with respect to the nozzle 16, the flow of the water jetted rearward from the deflector 17 is deflected upward or downward with respect to the nozzle 16. When the water is jetted from the nozzle 16 with the deflector 17 tilted upward or downward with respect to the nozzle 16 and with the bucket 18 located at the F-position, the propulsive force is generated so as to move a bow B1 (see FIG. 1) upward or downward with respect to a stern S1 (see FIG. 1), such that the trim of the watercraft 1 is changed.

The trim is one index indicating how much the watercraft 1 is tilted anteroposteriorly with respect to the water surface. The trim indicates a difference between a distance from a water surface cross position of the bow B1 to a keel and a distance from a water surface cross position of the stern S1 to the keel. In other words, the trim indicates a difference between a distance from a waterline WL at the bow B1 (see FIG. 1) to the keel and a distance from a waterline WL at the stern S1 to the keel.

When the water is jetted from the nozzle 16 with the deflector 17 tilted upward with respect to the nozzle 16 and with the bucket 18 located at the F-position, the propulsive force is generated so as to move the bow B1 upward with respect to the stern S1. On the contrary, when the water is jetted from the nozzle 16 with the deflector 17 tilted downward with respect to the nozzle 16 and with the bucket 18 located at the F-position, the propulsive force is generated so as to move the bow B1 downward with respect to the stern S1.

In the following description, the upward movement of the bow B1 with respect to the stern S1 is sometimes referred to as "bow up" or "trim up" and the downward movement of the bow B1 with respect to the stern S1 is sometimes referred to as "trim down." In the following description, the vertical position of the deflector 17 with respect to the nozzle 16 is sometimes referred to as "trim position." The trim position is herein synonymous with the trim angle of the deflector 17 which indicates an upward or downward angle of the center line of the deflector 17 with respect to the center line of the nozzle 16. In the following description, the trim angle of the deflector 17 is sometimes referred to simply as "trim angle."

The watercraft 1 includes a trim adjuster 21 to adjust the trim. In FIG. 2, the trim adjuster 21 is illustrated as including the deflector 17 which jets the water rearward and is pivotal upward and downward with respect to the hull 3, and a trim actuator 20 which pivots the deflector 17 upward and downward with respect to the hull 3 by way of example. The ECU 31 controls the trim actuator 20 to change the trim angle of the deflector 17 corresponding to the trim angle of the trim adjuster 21 to move the bow B1 upward and downward with respect to the stern S1. The trim of the watercraft 1 is able to be changed by increasing or reducing the trim angle of the deflector 17.

The deflector 17 is pivotal upward and downward with respect to the nozzle 16 within a range from a minimum trim angle position to a maximum trim angle position. In FIG. 2, the deflector 17 is illustrated as being pivotal upward and downward with respect to the nozzle 16 in a range from a second down position D2 to a third up position U3 by way of example. The trim angle is increased stepwise from the second down position D2, to a first down position D1, to a neutral position N (which is a position shown in FIG. 2), to a first up position U1, to a second up position U2, and to the third up position U3 in this order. The second down position D2 is an example of the minimum trim angle position. The third up position U3 is an example of the maximum trim angle position. The neutral position N is a position at which the trim angle is zero.

The propulsion system 9 includes the trim actuator 20 which pivots the deflector 17 upward and downward with respect to the nozzle 16 to locate the deflector 17 at a desired position within the range from the second down position D2 to the third up position U3. The trim actuator 20 may include an electric motor. The trim actuator 20 may be an actuator including a drive source other than the electric motor. The trim actuator 20 is connected to the ECU 31. The ECU 31 controls the trim actuator 20 to cause the trim actuator 20 to move the deflector 17.

As shown in FIG. 3, the watercraft 1 includes the ECU (Electronic Control Unit) 31 which controls electric devices provided in the watercraft 1, and an SCU (Shift Control Unit) 32 which controls the electric devices provided in the watercraft 1 according to commands of the ECU 31. The ECU 31 is an example of the controller. The ECU 31 is connected to the SCU 32 through a communication network N1 configured in conformity with communication standards such as CAN (Controller Area Network). The ECU 31 and the SCU 32 send and receive information and commands necessary for the control of the watercraft 1 through the communication network N1.

The ECU 31 and the SCU 32 are, for example, computers. The ECU 31 is configured or programmed to cause the watercraft 1 to perform a process to be described below. The ECU 31 includes a memory 31*m* which stores programs and other information, and a processor such as a CPU (Central Processing Unit) 31*c* which performs computations and issues commands according to the programs stored in the memory 31*m*. The ECU 31 further includes an input interface 31*i* which acquires the detection values of sensors provided in the watercraft 1, an output interface 310 which drives the electric devices provided in the watercraft 1, and a communication interface 31*co* which communicates through the communication network N1. The SCU 32 also includes a memory, a processor such as a CPU, an input interface, an output interface, and a communication interface.

The ECU 31 is connected to the reverse actuator 19 and the trim actuator 20 via the SCU 32. The SCU 32 operates the reverse actuator 19 and the trim actuator 20 according to commands acquired from the ECU 31. The ECU 31 may operate the reverse actuator 19 and the trim actuator 20 by directly controlling the reverse actuator 19 and the trim actuator 20 rather than by sending the commands to the SCU 32 for the operation of the reverse actuator 19 and the trim actuator 20. In this case, the SCU 32 may be obviated.

The watercraft 1 includes an acceleration operator position sensor 33 to detect the position of the acceleration operator 7, a reverse operator position sensor 34 to detect the position of the reverse operator 8, and an engine speed sensor 35 to detect the rotation speed of the engine 10. The watercraft 1 further includes a bucket position sensor 36 to detect the position of the bucket 18, a trim angle sensor 37 to detect the trim angle of the deflector 17, a watercraft speed sensor 38 to detect a watercraft speed (the speed of the watercraft 1), and a capsize sensor 39 to detect whether or not the hull 3 is capsized. These sensors are connected to the ECU 31.

The ECU 31 changes the output of the engine 10 based on the detection value of the acceleration operator position sensor 33. Similarly, the ECU 31 changes the output of the engine 10 based on the detection value of the reverse operator position sensor 34. The ECU 31 detects, based on the detection value of the bucket position sensor 36, whether or not the bucket 18 is located at any position within the range from the F-position to the R-position. Therefore, the ECU 31 determines, based on the detection value of the bucket position sensor 36, whether the shift mode of the watercraft 1 is an F-mode to advance the watercraft 1 or an R-mode to reverse the watercraft 1.

The capsize sensor 39 is an ON/OFF sensor which is switched between ON and OFF. The capsize sensor 39 is attached to the hull 3. The capsize sensor 39 is also referred to as overturn sensor. When the hull 3 is capsized or the hull 3 is significantly tilted leftward or rightward, the capsize sensor 39 is switched from OFF to ON. When the vertical acceleration of the hull 3 is great, the capsize sensor 39 is also switched between ON and OFF. When the watercraft 1 goes over a big wave, for example, great downward and upward inertial forces are applied to the capsize sensor 39, such that the capsize sensor 39 is switched from OFF to ON and then back to OFF. If the capsize sensor 39 is continuously maintained in an ON state, the ECU 31 determines that the hull 3 is capsized, and stops the engine 10.

The watercraft 1 includes a meter 40 which displays information about the watercraft 1. The meter 40 is a digital meter, for example. The meter 40 may be a touch panel display or may be a non-touch panel display. The meter 40 may be an analog meter. The meter 40 is attached to the steering operator 6. The meter 40 may be disposed at any position in the watercraft 1, as long as the watercraft rider is able to view the meter 40 while operating the steering operator 6. The ECU 31 controls the meter 40 to display information about the watercraft 1 such as the watercraft speed and the trim angle on the meter 40.

The watercraft 1 includes a trim button 41 which is operated by the watercraft rider when the bow B1 is to be moved upward or downward with respect to the stern S1. In FIG. 3, the trim button 41 is illustrated as including a trim up button 41*u* which is operated by the watercraft rider for a trim up operation, and a trim down button 41*d* which is operated by the watercraft rider for a trim down operation by way of example. The trim button 41 may be a single button which doubles as the trim up button 41*u* and the trim down button 41*d*.

The trim up button 41*u* and the trim down button 41*d* may each be a mechanical manual button which is operated manually, or may each be a touch button (virtual button) which is a portion of the display screen of the touch panel display. The trim up button 41*u* and the trim down button 41*d* are attached to the steering operator 6. The trim up button 41*u* and the trim down button 41*d* may be attached to a component other than the steering operator 6, as long as the watercraft rider is able to operate these buttons while operating the steering operator 6.

The ECU 31 controls the trim actuator 20 to move the deflector 17 to locate the deflector 17 at one of the second down position D2, the first down position D1, the neutral position N, the first up position U1, the second up position U2, and the third up position U3. However, when the trim button 41 is operated, the ECU 31 locates the deflector 17 at a position other than the third up position U3, i.e., at one of the second down position D2, the first down position D1, the neutral position N, the first up position U1, and the second up position U2. The second up position U2 is an example of the manual upper limit angle.

The watercraft 1 includes a trim mode select button 42 which is operated by the watercraft rider when the trim mode of the watercraft 1 is to be selected. The trim mode select button 42 may be a mechanical manual button which is operated manually, or may be a touch button (virtual button) which is a portion of the display screen of the touch panel display. When the trim mode select button 42 is operated, the ECU 31 puts the watercraft 1 in one of plural trim modes including a manual trim mode and an automatic trim mode.

In the manual trim mode, the ECU 31 changes the trim angle of the deflector 17 only when the trim button 41 is operated. In the automatic trim mode, the ECU 31 changes the trim angle of the deflector 17 not only when the trim button 41 is operated but also when the trim button 41 is not operated. In the following description, the manual trim mode is sometimes referred to as MT mode, and the automatic trim mode is sometimes referred to as AT mode.

Figure 4:
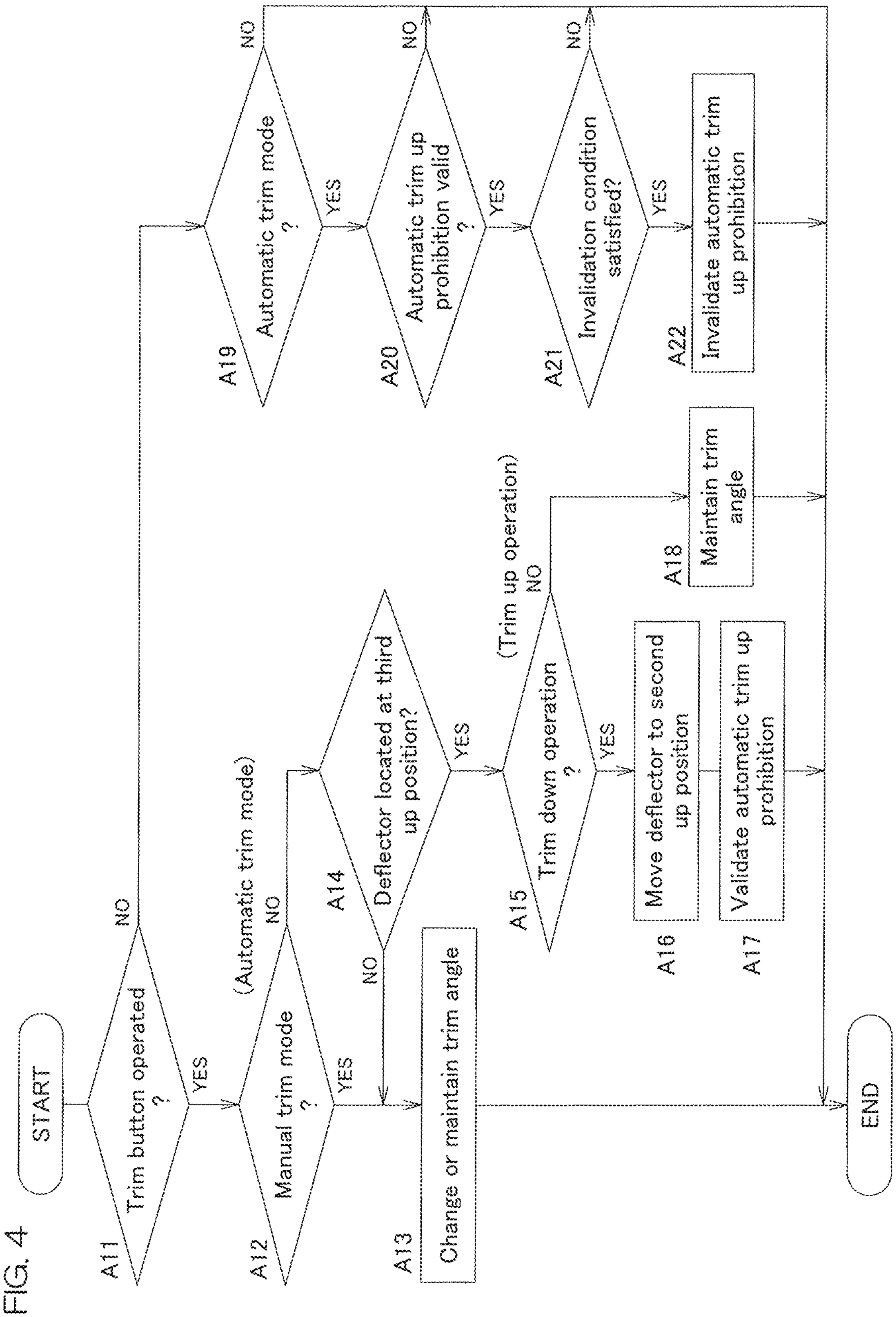
FIG. 4 is a flowchart showing an exemplary process flow to be performed when a trim button is operated.

FIG. 4 is a flowchart showing an exemplary process flow to be performed when the trim button 41 is operated.

If the trim up operation to move the bow B1 upward with respect to the stern S1 or the trim down operation to move the bow B1 downward with respect to the stern S1 is performed on the trim button 41 (YES in Step A11 in FIG. 4), the ECU 31 checks whether or not the watercraft 1 is in the MT mode (Step A12 in FIG. 4). In the MT mode, the ECU 31 changes the trim angle of the deflector 17 only when the trim button 41 is operated.

If the trim button 41 is operated when the watercraft 1 is in the MT mode (YES in Step A12 in FIG. 4), the ECU 31 pivots the deflector 17 upward or downward to change the trim angle of the deflector 17 according to the operation of the trim button 41 (Step A13 in FIG. 4). If the trim up operation is performed with the deflector 17 located at the second up position U2, however, the ECU 31 does not pivot the deflector 17, but holds still the deflector 17 at the second up position U2 (Step A13 in FIG. 4). If the trim down operation is performed with the deflector 17 located at the second down position D2, also, the ECU 31 does not pivot the deflector 17, but holds still the deflector 17 at the second down position D2 (Step A13 in FIG. 4). Thereafter, the ECU 31 ends the process shown in FIG. 4, and repeats the process sequence from Step A11 in FIG. 4.

If the trim button 41 is operated when the watercraft 1 is not in the MT mode, i.e., when the watercraft 1 is in the AT mode (NO in Step A12 in FIG. 4), the ECU 31 checks whether or not the deflector 17 is located at the third up position U3 (Step A14 in FIG. 4). In the automatic trim mode, the ECU 31 changes the trim angle of the deflector 17 not only when the trim button 41 is operated but also when the trim button 41 is not operated.

If the deflector 17 is not located at the third up position U3 (NO in Step A14 in FIG. 4), the ECU 31 changes or maintains the trim angle according to the operation of the trim button 41 (Step A13 in FIG. 4). If the deflector 17 is located at the third up position U3 (YES in Step A14 in FIG. 4) and the trim up operation is performed (NO in Step A15 in FIG. 4), the ECU 31 does not pivot the deflector 17, but holds still the deflector 17 at the third up position U3 (Step A18 in FIG. 4).

If the deflector 17 is located at the third up position U3 (YES in Step A14 in FIG. 4) and the trim down operation is performed (YES in Step A15 in FIG. 4), the ECU 31 pivots the deflector 17 downward to move the deflector 17 to the second up position U2 (Step A16 in FIG. 4). Further, the ECU 31 validates automatic trim up prohibition to prohibit the deflector 17 from being moved to the third up position U3 (Step A17 in FIG. 4).

If the trim button 41 is not operated (NO in Step A11 in FIG. 4), the ECU 31 checks whether or not the watercraft 1 is in the AT mode (Step A19 in FIG. 4). If the watercraft 1 is not in the AT mode, i.e., if the watercraft 1 is in the MT mode (NO in Step A19 in FIG. 4), the ECU 31 ends the process shown in FIG. 4, and repeats the process sequence from Step A11 in FIG. 4.

If the watercraft 1 is in the AT mode (YES in Step A19 in FIG. 4), the ECU 31 checks whether or not the automatic trim up prohibition is valid (Step A20 in FIG. 4). If the automatic trim up prohibition is invalid (NO in Step A20 in FIG. 4), the ECU 31 ends the process shown in FIG. 4, and repeats the process sequence from Step A11 in FIG. 4. If the automatic trim up prohibition is valid (YES in Step A20 in FIG. 4), the ECU 31 checks whether or not an invalidation condition to invalidate the automatic trim up prohibition is satisfied (Step A21 in FIG. 4).

If the invalidation condition is satisfied (YES in Step A21 in FIG. 4), the ECU 31 invalidates the automatic trim up prohibition (Step A22 in FIG. 4) to permit the deflector 17 to be moved to the third up position U3. If the invalidation condition is not satisfied (NO in Step A21 in FIG. 4), the ECU 31 ends the process shown in FIG. 4 without invalidating the automatic trim up prohibition, and repeats the process sequence from Step A11 in FIG. 4.

Next, the AT mode (automatic trim mode) will be described.

Figure 5:
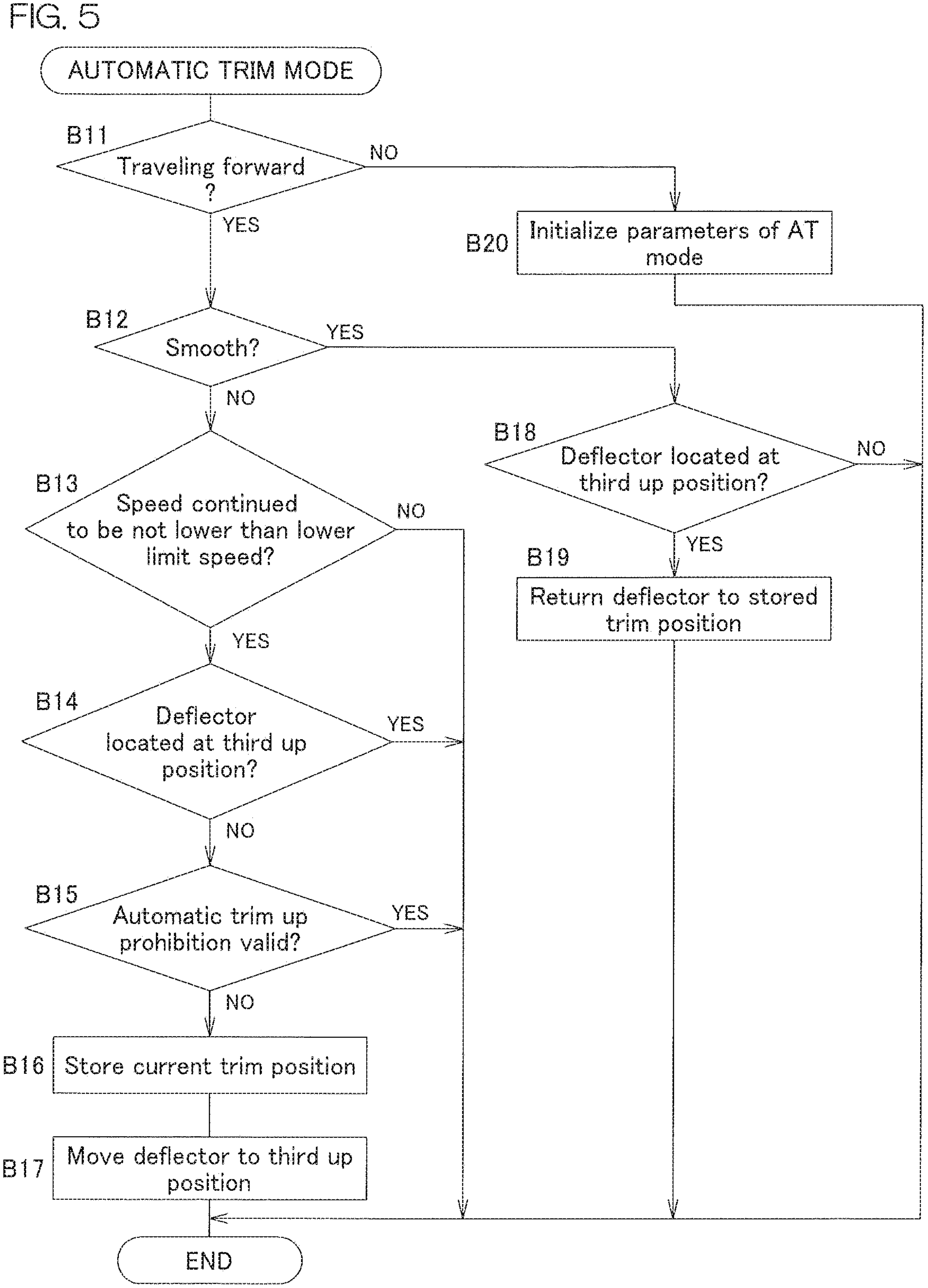
FIG. 5 is a flowchart showing an AT mode (automatic trim mode) in which a trim angle is automatically changed according to wave conditions by way of example.

FIG. 5 is a flowchart showing an example of the AT mode in which the trim angle is automatically changed according to the wave conditions.

The ECU 31 determines, based on the detection value of the bucket position sensor 36 and the detection value of the engine speed sensor 35, whether or not the watercraft 1 travels forward (Step B11 in FIG. 5). When the watercraft 1 travels forward (YES in Step B11 in FIG. 5), the ECU 31 performs a smooth water determination operation to determine whether or not the water surface on which the watercraft 1 travels is smooth (Step B12 in FIG. 5). The smooth water determination operation will be described below.

If the ECU 31 determines that the water surface is not smooth (NO in Step B12 in FIG. 5), the ECU 31 determines whether or not the watercraft 1 continuously travels forward at a speed not lower than a lower limit speed for a period of time not shorter than a predetermined period of time (Step B13 in FIG. 5). If the watercraft 1 continuously travels forward at a speed not lower than the lower limit speed for a period not shorter than the predetermined period (YES in Step B13 in FIG. 5), the ECU 31 determines, based on the detection value of the trim angle sensor 37, whether or not the deflector 17 is located at the third up position U3 (Step B14 in FIG. 5). If not (NO in Step B13 in FIG. 5), the ECU 31 ends the process shown in FIG. 5, and repeats the process sequence from Step B11 in FIG. 5.

The ECU 31 may determine, based on the detection value of the watercraft speed sensor 38, whether the watercraft speed is not lower than the lower limit speed, or may determine, based on the detection value of a sensor other than the watercraft speed sensor 38, whether the watercraft speed is not lower than the lower limit speed. The rotation speed of the engine 10 is generally directly proportional to the watercraft speed. For example, as the rotation speed of the engine 10 increases or decreases, the watercraft speed is increased or reduced with some delay. The ECU 31 is able to estimate the watercraft speed based on the detection value of the engine speed sensor 35. Therefore, the ECU 31 may determine, based on the detection value of the engine speed sensor 35, whether the watercraft speed is not lower than the lower limit speed. When the lower limit speed is 10 km/h, for example, the rotation speed of the engine 10 corresponding to the lower limit speed is, for example, 3,500 rpm. The lower limit speed and the rotation speed of the engine 10 are not limited to the aforementioned values.

If the deflector 17 is located at the third up position U3 (YES in Step B14 in FIG. 5), the ECU 31 ends the process shown in FIG. 5, and repeats the process sequence from Step B11 in FIG. 5. If the deflector 17 is located at a position other than the third up position U3 (NO in Step B14 in FIG. 5), the ECU 31 checks whether or not the automatic trim up prohibition is valid (Step B15 in FIG. 5).

If the automatic trim up prohibition is valid (YES in Step B15 in FIG. 5), the ECU 31 ends the process shown in FIG. 5 without moving the deflector 17 to the third up position U3, and repeats the process sequence from Step B11 in FIG. 5. If not (NO in Step B15 in FIG. 5), the ECU 31 stores the current trim position of the deflector 17, i.e., the current trim angle of the deflector 17 (Step B16 in FIG. 5), and moves the deflector 17 to the third up position U3 (Step B17 in FIG. 5).

If the watercraft 1 travels forward (YES in Step B11 in FIG. 5) and the ECU 31 determines that the water surface is smooth (YES in Step B12 in FIG. 5), the ECU 31 checks whether or not the deflector 17 is located at the third up position U3 (Step B18 in FIG. 5). For example, the deflector 17 is often located at the third up position U3 immediately after the watercraft 1 is moved from a rough water region in which the water surface is not smooth to a smooth water region in which the water surface is smooth, or immediately after the water surface is changed into the smooth water state.

If it is determined that the water surface is smooth (YES in Step B12 in FIG. 5) and yet the deflector 17 is located at the third up position U3 (YES in Step B18 in FIG. 5), the ECU 31 moves the deflector 17 from the third up position U3 to the position stored in Step B16 to set the trim angle back to the stored value (Step B19 in FIG. 5). If not (NO in Step B18 in FIG. 5), the ECU 31 ends the process shown in FIG. 5 without changing the trim angle of the deflector 17, and repeats the process sequence from Step B11 in FIG. 5.

When the watercraft 1 does not travel forward (NO in Step B11 in FIG. 5), i.e., the watercraft 1 stops or reverses, the ECU 31 initializes the parameters of the AT mode to initial values or into an initial state (Step B20 in FIG. 5). Even with the automatic trim up prohibition (one of the parameters of the AT mode) being valid, for example, the ECU 31 invalidates the automatic trim up prohibition back into an initial state, if the shift mode of the watercraft 1 is changed from the F-mode to the R-mode.

Figure 6:
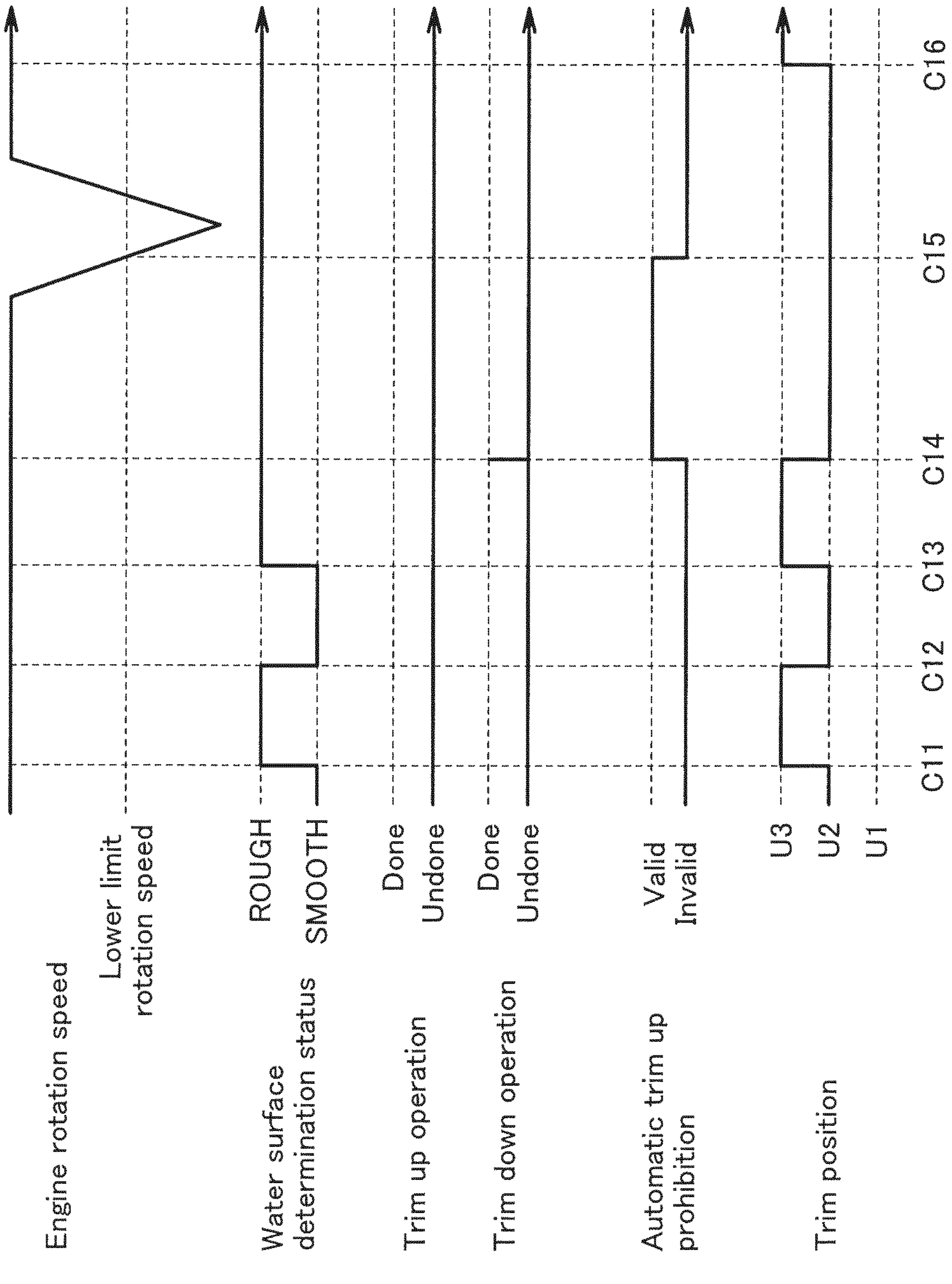
FIG. 6 is a time chart showing the AT mode by way of example.
Figure 7A:
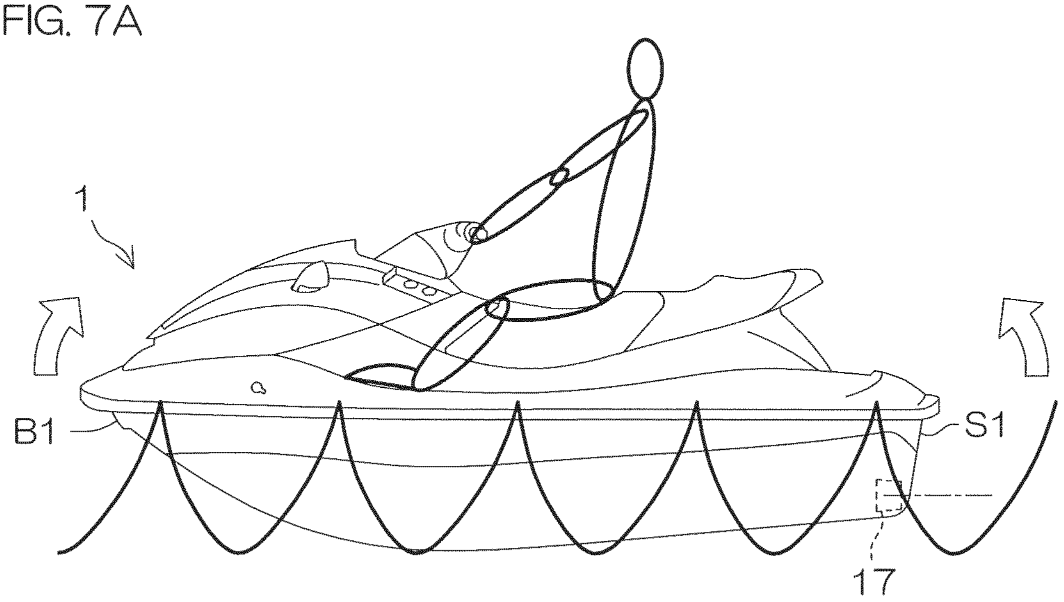
FIG. 7A is a schematic diagram showing an exemplary relationship between the wave conditions and the trim.
Figure 7B:
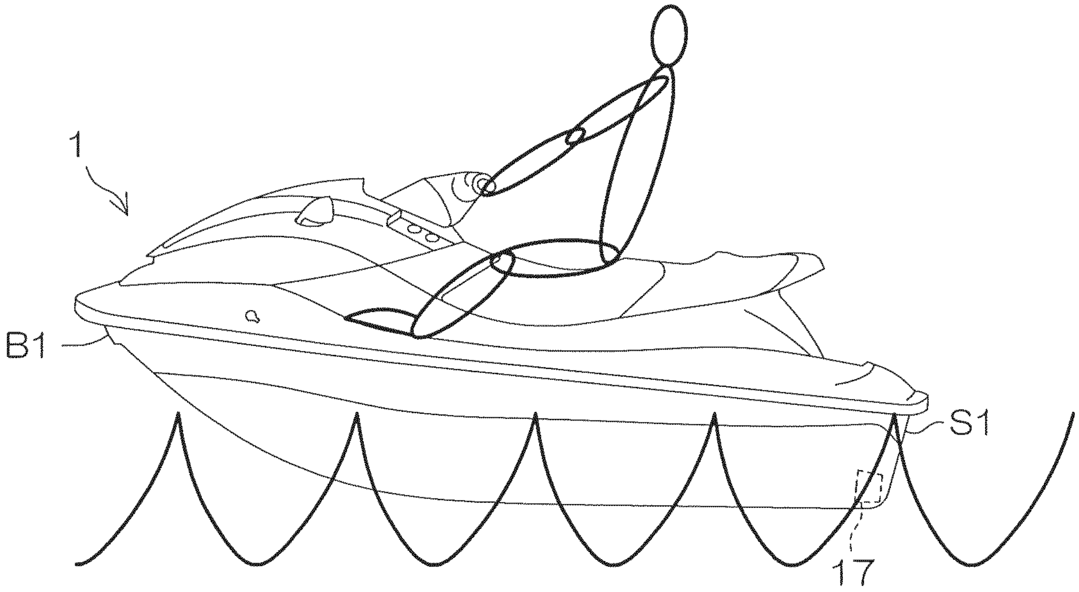
FIG. 7B is a schematic diagram showing another exemplary relationship between the wave conditions and the trim.
Figure 7C:
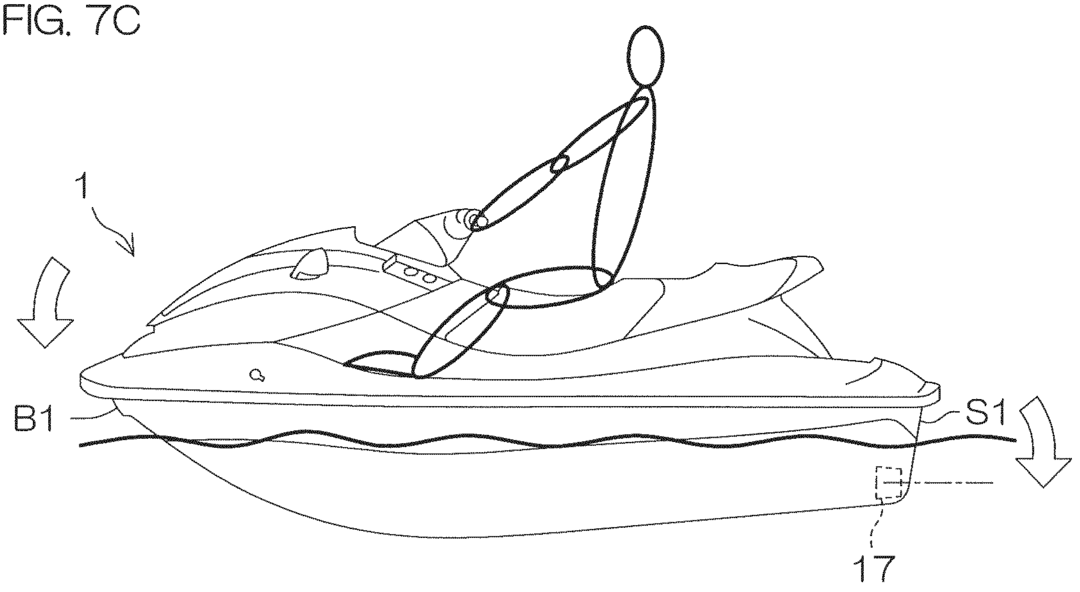
FIG. 7C is a schematic diagram showing still another exemplary relationship between the wave conditions and the trim.

FIG. 6 is a time chart showing an example of the AT mode. FIGS. 7A, 7B, and 7C are schematic diagrams showing exemplary relationships between the wave conditions and the trim. In FIG. 6, U3, U2, and U1 indicate the third up position U3, the second up position U2, and the first up position U1, respectively.

When the watercraft 1 travels forward at a speed not lower than the lower limit speed for a period not shorter than the predetermined period and the watercraft 1 moves into a rough water region from a smooth water region, the ECU 31 determines that the water surface is not smooth. At this time, if the automatic trim up prohibition is invalid, the ECU 31 stores the current trim position of the deflector 17, and moves the deflector 17 to the third up position U3. In FIG. 6, the ECU 31 moves the deflector 17 from the second up position U2 to the third up position U3 at time C11 by way of example. In this example, the second up position U2 corresponds to the current trim position of the deflector 17.

When the watercraft 1 moves into the smooth water region from the rough water region after the deflector 17 is located at the third up position U3, the ECU 31 determines that the water surface is smooth, and moves the deflector 17 from the third up position U3 to the second up position U2 (at time C12 in FIG. 6). When the watercraft 1 moves again into the rough water region from the smooth water region, the ECU 31 determines that the water surface is not smooth and, if the automatic trim up prohibition is invalid, the ECU 31 moves the deflector 17 from the second up position U2 to the third up position U3 (at time C13 in FIG. 6).

FIG. 7A illustrates a state in which the watercraft 1 travels forward in the rough water region. In this case, the ECU 31 determines that the water surface is not smooth, and moves the deflector 17 to the third up position U3. FIG. 7B illustrates a state in which the bow B1 is moved upward with respect to the stern S1 as compared with the state shown in FIG. 7A. Thus, the water splash is reduced even if the watercraft 1 is in the rough water region. FIG. 7C illustrates a state in which the watercraft 1 is moved into the smooth water region from the rough water region, and the deflector 17 is moved back to the previous trim position. Thus, the bow B1 is moved downward with respect to the stern S1 as compared with the state shown in FIG. 7B.

If the watercraft rider operates the trim down button 41*d* when the watercraft 1 travels forward at a speed not lower than the lower limit speed in the rough water region and the deflector 17 is located at the third up position U3, the ECU 31 determines that the water surface is not smooth and yet moves the deflector 17 from the third up position U3 to the second up position U2 (at time C14 in FIG. 6). Further, the ECU 31 validates the automatic trim up prohibition. Therefore, even if the ECU 31 determines that the water surface is not smooth after the watercraft rider stops the operation of the trim down button 41*d*, the ECU 31 does not move the deflector 17 to the third up position U3.

If the invalidation condition is satisfied, the automatic trim up prohibition is invalidated. FIG. 6 shows an exemplary case in which the automatic trim up prohibition is invalidated when the rotation speed of the engine 10 is reduced to lower than a lower limit rotation speed (at time C15 in FIG. 6). The condition that the rotation speed of the engine 10 is lower than the lower limit rotation speed is an example of the invalidation condition. When the invalidation condition is satisfied, the ECU 31 may change a water surface determination status (indicating the result of the determination on the water surface) stored therein from ROUGH (indicating that the water surface is not smooth) to SMOOTH (indicating that the water surface is smooth), or may maintain the current determination result. In the exemplary case shown in FIG. 6, even if the invalidation condition is satisfied, the water surface determination status is maintained as ROUGH.

If the rotation speed of the engine 10 is increased to not lower than the lower limit rotation speed and maintained at not lower than the lower limit rotation speed for a certain period of time after the rotation speed of the engine 10 is reduced to lower than the lower limit rotation speed, the ECU 31 determines that the watercraft 1 travels forward at a speed not lower than the lower limit speed for a period not shorter than the predetermined period. At this time, the water surface determination status in the ECU 31 is ROUGH and, if the automatic trim up prohibition is invalid, the ECU 31 moves the deflector 17 to the third up position U3 (at time C16 in FIG. 6) without determining again whether or not the water surface is smooth. Therefore, the deflector 17 is moved to the third up position U3 in a shorter period of time than in a case in which the ECU 31 determines again whether or not the water surface is smooth.

Next, the smooth water determination operation will be described.

Figure 8:
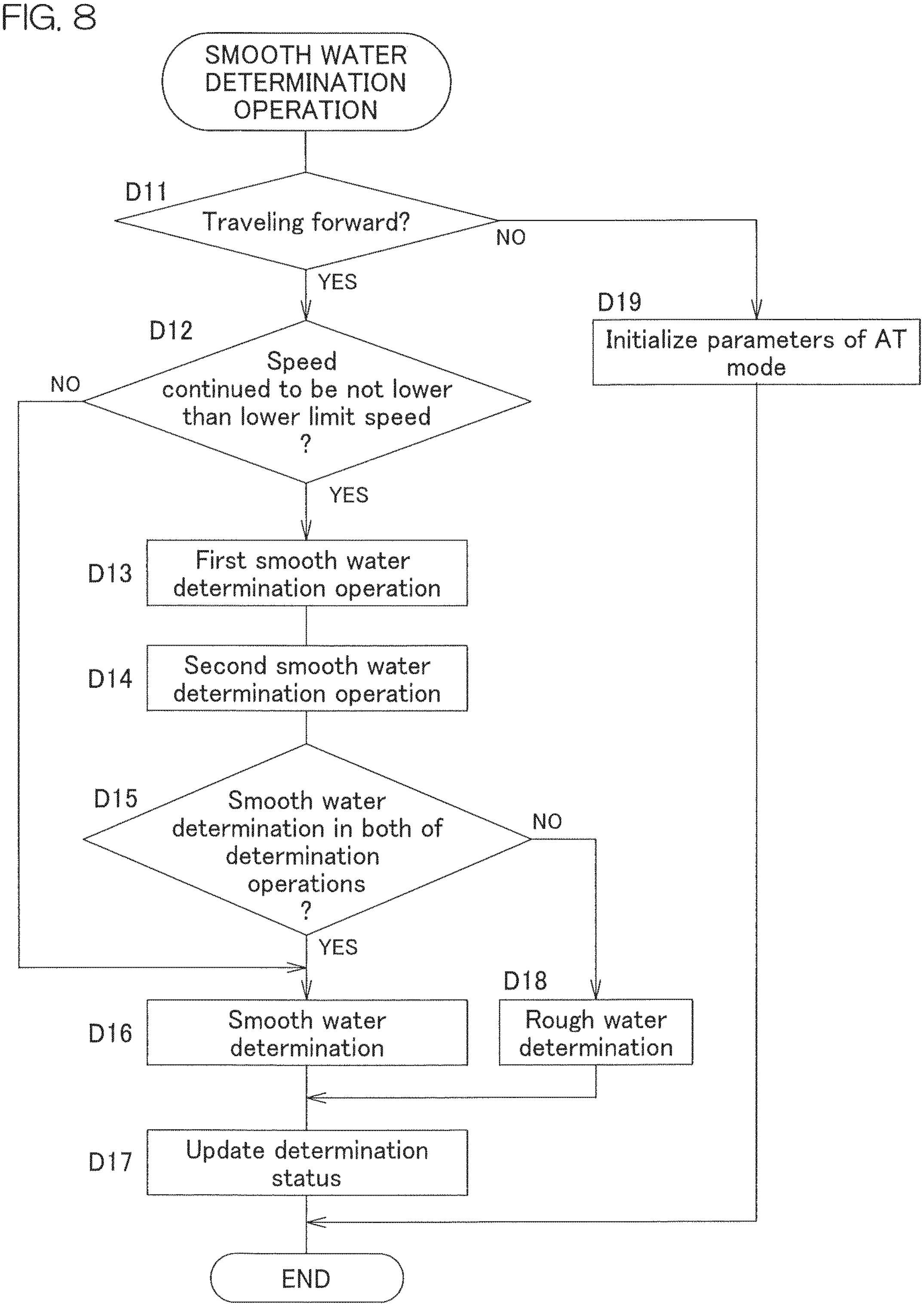
FIG. 8 is a flowchart showing an exemplary smooth water determination operation to be performed to determine whether or not a water surface on which the watercraft travels is smooth.

FIG. 8 is a flowchart showing an example of the smooth water determination operation to be performed to determine whether or not the water surface on which the watercraft 1 travels is smooth.

In the smooth water determination operation, the ECU 31 determines, based on the detection value of the bucket position sensor 36 and the detection value of the engine speed sensor 35, whether or not the watercraft 1 travels forward (Step D11 in FIG. 8). When the watercraft 1 travels forward (YES in Step D11 in FIG. 8), the ECU 31 determines whether or not the watercraft 1 continuously travels forward at a speed not lower than the lower limit speed for a period not shorter than the predetermined period (Step D12 in FIG. 8).

If the watercraft 1 travels forward at a speed not lower than the lower limit speed for a period not shorter than the predetermined period (YES in Step D12 in FIG. 8), the ECU 31 performs a first smooth water determination operation to determine, based on the detection value of the capsize sensor 39, whether or not the water surface is smooth (Step D13 in FIG. 8). Further, the ECU 31 performs a second smooth water determination operation to determine, based on the detection value of the engine speed sensor 35, whether or not the water surface is smooth (Step D14 in FIG. 8). The first smooth water determination operation and the second smooth water determination operation will be described below.

If the ECU 31 determines, in both of the first smooth water determination operation and the second smooth water determination operation, that the water surface is smooth (YES in Step D15 in FIG. 8), the ECU 31 finally determines that the water surface is smooth (Step D16 in FIG. 8), and updates the water surface determination status (indicating the result of the determination on the water surface) stored in the ECU 31 (Step D17 in FIG. 8). That is, if the current water surface determination status is ROUGH, the water surface determination status is changed to SMOOTH. If the current water surface determination status is SMOOTH, the water surface determination status is not changed.

If it is determined, in at least one of the first smooth water determination operation and the second smooth water determination operation, that the water surface is not smooth (NO in Step D15 in FIG. 8), the ECU 31 finally determines that the water surface is not smooth (Step D18 in FIG. 8). In FIG. 8, "Rough water determination" indicates that it is finally determined that the water surface is not smooth. Thereafter, the ECU 31 updates the water surface determination status in the ECU 31 (Step D17 in FIG. 8). That is, if the current water surface determination status is SMOOTH, the water surface determination status is changed to ROUGH. If the current water surface determination status is ROUGH, the water surface determination status is not changed.

If the watercraft 1 travels forward (YES in Step D11 in FIG. 8) but the watercraft 1 does not continuously travel forward at a speed not lower than the lower limit speed for a period not shorter than the predetermined period, the determination of Step D12 in FIG. 8 is negative. That is, if the watercraft 1 travels forward at a speed lower than the lower limit speed, or if the watercraft speed is reduced to lower than the lower limit speed before the lapse of the predetermined period, the determination of Step D12 in FIG. 8 is negative. In this case, the ECU 31 determines that the water surface is smooth (Step D16 in FIG. 8), and updates the water surface determination status in the ECU 31 (Step D17 in FIG. 8). If the watercraft 1 does not travel forward (NO in Step D11 in FIG. 8), the ECU 31 initializes the parameters of the AT mode to the initial values or into the initial state (Step D19 in FIG. 8).

Next, the first smooth water determination operation will be described.

Figure 9:
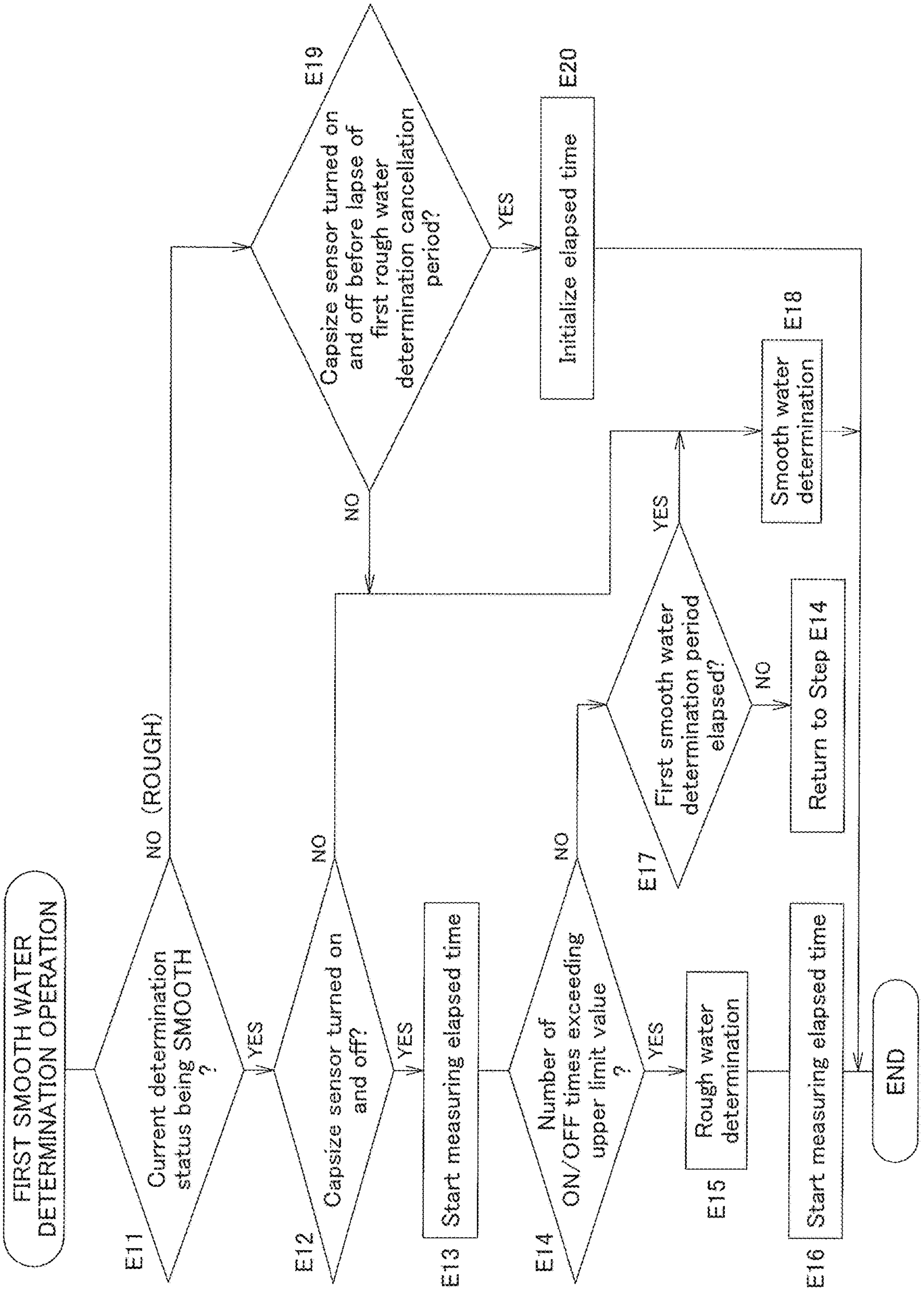
FIG. 9 is a flowchart showing an exemplary first smooth water determination operation to be performed to determine, based on the detection value of a capsize sensor, whether or not the water surface is smooth.

FIG. 9 is a flowchart showing an example of the first smooth water determination operation to be performed to determine, based on the detection value of the capsize sensor 39, whether or not the water surface is smooth.

In the first smooth water determination operation, the ECU 31 checks whether or not the water surface determination status in the ECU 31 is SMOOTH (Step E11 in FIG. 9). If the current water surface determination status is SMOOTH (YES in Step E11 in FIG. 9), the ECU 31 monitors whether or not the capsize sensor 39 is turned on and off, i.e., whether or not the capsize sensor 39 is reciprocally switched between ON and OFF (Step E12 in FIG. 9).

When the watercraft 1 travels forward in the rough water region, a greater magnitude of force is vertically applied to the hull 3, so that the hull 3 is liable to be reciprocally moved upward and downward. At this time, the capsize sensor 39 is turned on and off. If the capsize sensor 39 is turned on and off (YES in Step E12 in FIG. 9), the ECU 31 changes the number of ON/OFF times (indicating the number of times in which the capsize sensor 39 is turned on and off) from an initial value of 0 to 1, and then starts measuring an elapsed time from the time of the change (Step E13 in FIG. 9).

The ECU 31 monitors whether or not the capsize sensor 39 is turned on and off while measuring the elapsed time from the time at which the number of ON/OFF times is changed to 1, and determines whether or not the number of ON/OFF times exceeds a first smooth water determination upper limit value which is an integer of not less than 2 (Step E14 in FIG. 9). If the number of ON/OFF times does not exceed the first smooth water determination upper limit value (NO in Step E14 in FIG. 9), the ECU 31 checks whether or not a first smooth water determination period elapses from the time at which the number of ON/OFF times is changed to 1 (Step E17 in FIG. 9). If the first smooth water determination period does not elapse (NO in Step E17 in FIG. 9), the ECU 31 checks again whether or not the number of ON/OFF times exceeds the first smooth water determination upper limit value (back to Step E14 in FIG. 9).

If the number of ON/OFF times exceeds the first smooth water determination upper limit value before the lapse of the first smooth water determination period from the time at which the number of ON/OFF times is changed to 1 (YES in Step E14 in FIG. 9), the ECU 31 determines that the water surface is not smooth (Step E15 in FIG. 9). Further, the ECU 31 starts measuring the elapsed time from the time of the determination that the water surface is not smooth (Step E16 in FIG. 9). Thereafter, the ECU 31 ends the process shown in FIG. 9, and repeats the process sequence from Step E11 in FIG. 9.

If the capsize sensor 39 is not turned on and off during the monitoring by the ECU 31 (NO in Step E12 in FIG. 9), the ECU 31 determines that the water surface is smooth (Step E18 in FIG. 9). If the capsize sensor 39 is turned on and off (YES in Step E12 in FIG. 9) but the number of ON/OFF times is not greater than the first smooth water determination upper limit value before the lapse of the first smooth water determination period (YES in Step E17 in FIG. 9), the ECU 31 determines that the water surface is smooth (Step E18 in FIG. 9).

If the water surface determination status in the ECU 31 is ROUGH (NO in Step E11 in FIG. 9), the ECU 31 monitors whether or not the capsize sensor 39 is turned on and off before a first rough water determination cancellation period elapses from the time of the determination that the water surface is not smooth (Step E19 in FIG. 9). That is, the ECU 31 monitors whether or not the capsize sensor 39 is turned on and off before the lapse of the first rough water determination cancellation period from the start of the measurement of the elapsed time in Step E16 in FIG. 9 (Step E19 in FIG. 9).

If the capsize sensor 39 is turned on and off before the lapse of the first rough water determination cancellation period (YES in Step E19 in FIG. 9), the elapsed time from the determination that the water surface is not smooth is initialized to the initial value by the ECU 31 (Step E20 in FIG. 9), and the ECU 31 measures again the elapsed time. If the capsize sensor 39 is not turned on and off before the lapse of the first rough water determination cancellation period (NO in Step E19 in FIG. 9), the ECU 31 determines that the water surface is smooth (Step E18 in FIG. 9). In other words, the ECU 31 determines that the water surface is changed into the smooth water state, or that the watercraft 1 is moved into the smooth water region from the rough water region.

Figure 10A:
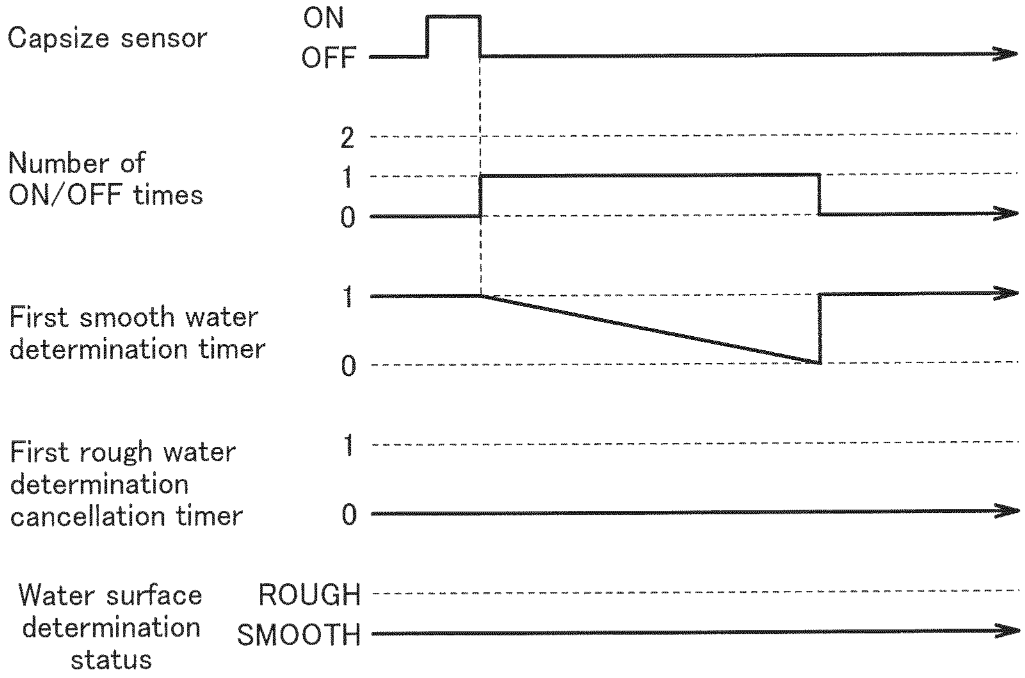
FIG. 10A is a time chart showing an exemplary process to be performed when it is determined that the water surface is smooth in the first smooth water determination operation.

FIG. 10A is a time chart showing an exemplary process to be performed when it is determined that the water surface is smooth in the first smooth water determination operation.

If the capsize sensor 39 is turned on and off, the ECU 31 changes the number of ON/OFF times (indicating the number of times in which the capsize sensor 39 is reciprocally switched between ON and OFF) from an initial value of 0 to 1, and starts measuring the elapsed time from the time of the change. FIG. 10A shows an exemplary case in which the ECU 31 actuates a first smooth water determination timer when the number of ON/OFF times is changed to 1. The value of the first smooth water determination timer is changed from an initial value to an end value before the lapse of the first smooth water determination period from the actuation of the timer. In the exemplary case shown in FIG. 10A, the initial value of the first smooth water determination timer is 1, and the end value of the first smooth water determination timer is 0.

After the measurement of the elapsed time is started, the ECU 31 continuously monitors whether or not the capsize sensor 39 is turned on and off, and counts the number of ON/OFF times. If the number of ON/OFF times exceeds the first smooth water determination upper limit value before the lapse of the first smooth water determination period, the ECU 31 determines that the water surface is not smooth. In the exemplary case shown in FIG. 10A, the number of ON/OFF times is 1 after the lapse of the first smooth water determination period. In the exemplary case shown in FIG. 10A, the first smooth water determination upper limit value is 3. In the exemplary case, therefore, the ECU 31 determines that the water surface is smooth.

Figure 10B:
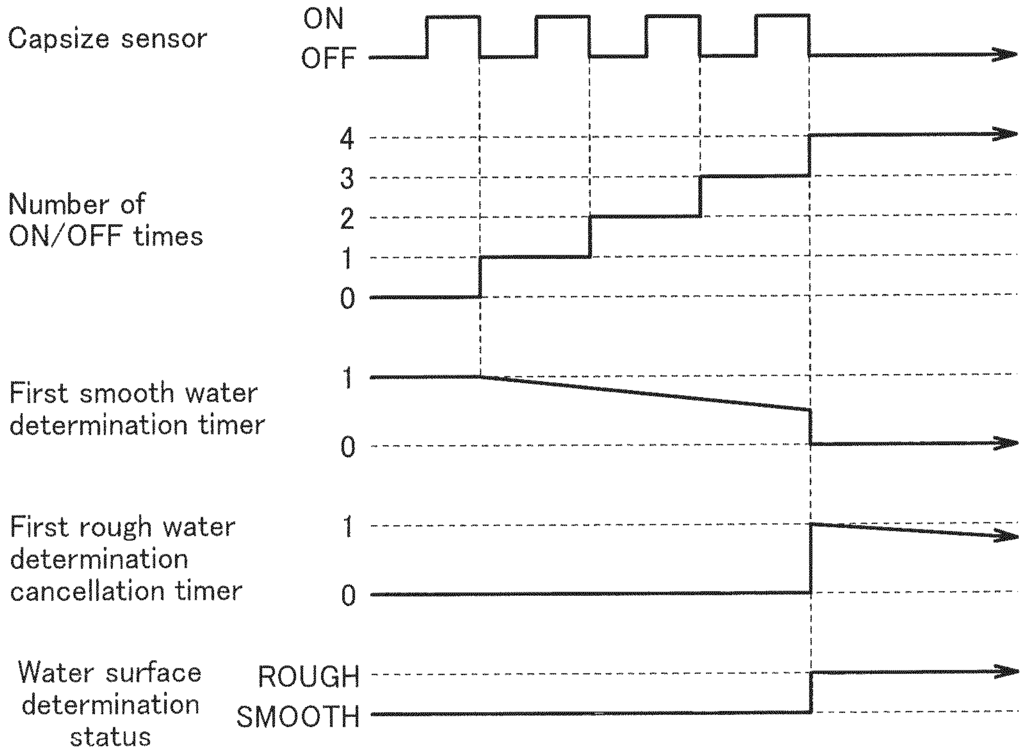
FIG. 10B is a time chart showing another exemplary process to be performed when it is determined that the water surface is not smooth in the first smooth water determination operation.

FIG. 10B is a time chart showing another exemplary process to be performed when it is determined that the water surface is not smooth in the first smooth water determination operation.

As in the exemplary case shown in FIG. 10A, if the capsize sensor 39 is turned on and off, the ECU 31 changes the number of ON/OFF times (indicating the number of times in which the capsize sensor 39 is turned on and off) from an initial value of 0 to 1, and causes the first smooth water determination timer to measure the elapsed time from the time of the change. Thereafter, the ECU 31 counts the number of ON/OFF times, while causing the first smooth water determination timer to measure the elapsed time.

FIG. 10B shows an exemplary case in which the number of ON/OFF times reaches 4 before the lapse of the first smooth water determination period (e.g., 20 to 30 seconds). In the exemplary case shown in FIG. 10B, the first smooth water determination upper limit value is 3. In this exemplary case, therefore, the number of ON/OFF times exceeds the first smooth water determination upper limit value before the lapse of the first smooth water determination period. When the number of ON/OFF times exceeds the first smooth water determination upper limit value, the ECU 31 determines that the water surface is not smooth, and changes the status from SMOOTH to ROUGH in the first smooth water determination operation.

Figure 10C:
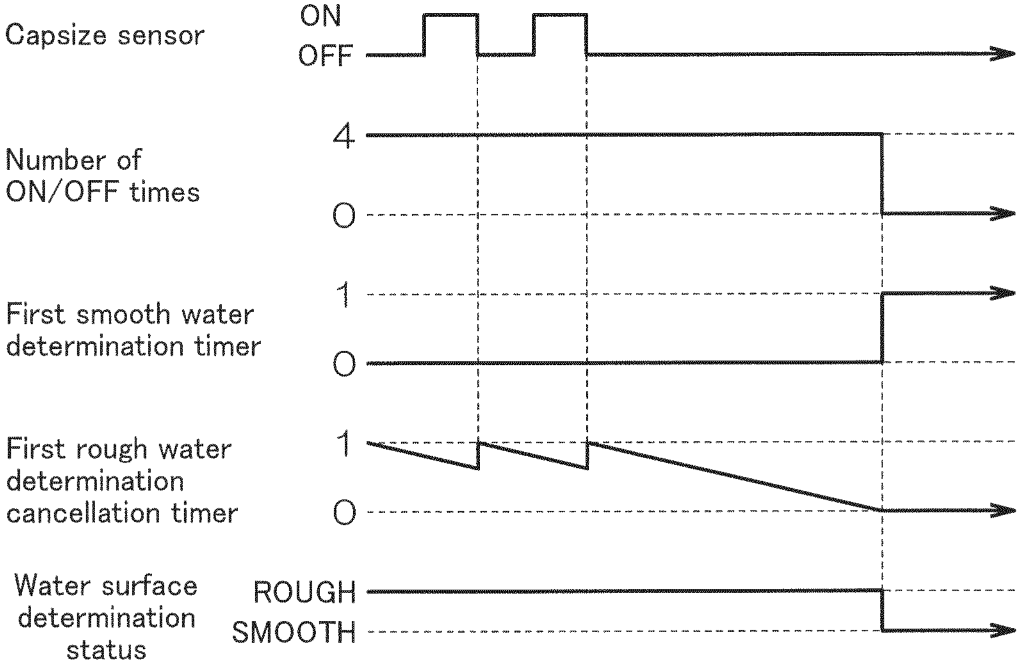
FIG. 10C is a time chart showing still another exemplary process to be performed when it is determined that the water surface is smooth after the determination that the water surface is not smooth in the first smooth water determination operation.

FIG. 10C is a time chart showing still another exemplary process to be performed when it is determined that the water surface is smooth after the determination that the water surface is not smooth in the first smooth water determination operation.

If the ECU 31 determines that the water surface is not smooth, the ECU 31 starts measuring the elapsed time from the time of the determination. FIG. 10C shows an exemplary case in which the ECU 31 actuates a first rough water determination cancellation timer when the ECU 31 determines that the water surface is not smooth. The value of the first rough water determination cancellation timer is changed from an initial value to an end value before the lapse of the first rough water determination cancellation period from the actuation. In the exemplary case shown in FIG. 10C, the initial value of the first rough water determination cancellation timer is 1, and the end value of the first rough water determination cancellation timer is 0.

After the measurement of the elapsed time is started, the ECU 31 continuously monitors whether or not the capsize sensor 39 is turned on and off. If the capsize sensor 39 is turned on and off before the lapse of the first rough water determination cancellation period from the time at which the ECU 31 determines that the water surface is not smooth, the ECU 31 changes the value of the first rough water determination cancellation timer to 1 (initial value), and causes the first rough water determination cancellation timer to measure again the time. In the exemplary case shown in FIG. 10C, the capsize sensor 39 is turned on and off twice, and the first rough water determination cancellation timer is reset twice.

If the capsize sensor 39 is not turned on and off before the lapse of the first rough water determination cancellation period from the time at which the ECU 31 determines that the water surface is not smooth, the ECU 31 determines that the water surface is smooth. That is, the ECU 31 determines that the water surface is changed into the smooth water state, or that the watercraft 1 is moved into the smooth water region from the rough water region. In this case, the ECU 31 changes the water surface determination status back to SMOOTH in the first smooth water determination operation. Further, the ECU 31 sets the number of ON/OFF times back to an initial value of 0.

Next, the second smooth water determination operation will be described.

Figure 11:
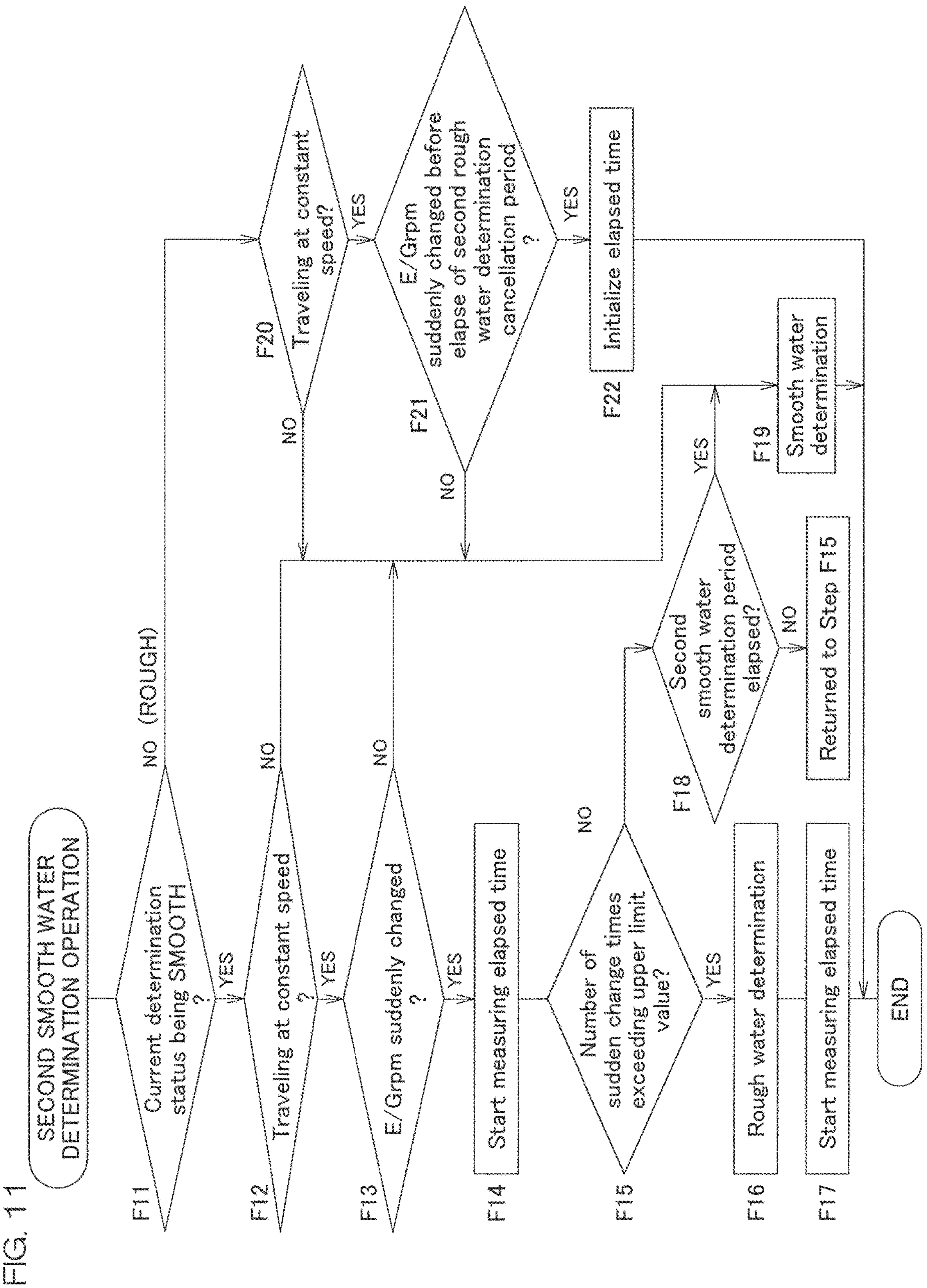
FIG. 11 is a flowchart showing an exemplary second smooth water determination operation to be performed to determine, based on the detection value of an engine speed sensor, whether or not the water surface is smooth.

FIG. 11 is a flowchart showing an example of the second smooth water determination operation to be performed to determine, based on the detection value of the engine speed sensor 35, whether or not the water surface is smooth.

In the second smooth water determination operation, the ECU 31 checks whether or not the water surface determination status in the ECU 31 is SMOOTH (Step F11 in FIG. 11). If the current water surface determination status is SMOOTH (YES in Step F11 in FIG. 11), the ECU 31 performs a constant speed traveling determination operation to determine whether or not the watercraft 1 continuously travels forward at a constant speed. The constant speed traveling determination operation will be described below.

When the watercraft 1 travels forward in the rough water region, the watercraft 1 often repeatedly alternately experiences an off-water state in which at least a portion of the hull 3 is moved away from the water surface and an on-water state in which the hull 3 is moved down onto the water surface. When the hull 3 is moved away from the water surface, the water resistance applied to the engine 10 is reduced and, even with the position of the acceleration operator 7 kept unchanged, the rotation speed of the engine 10 is suddenly increased. When the hull 3 is moved down onto the water surface, the water resistance applied to the engine 10 is increased and, even with the position of the acceleration operator 7 kept unchanged, the rotation speed of the engine 10 is suddenly reduced.

In the constant speed traveling determination operation, if the ECU 31 determines that the watercraft 1 continuously travels forward at a constant speed (YES in Step F12 in FIG. 11), the ECU 31 monitors, based on the detection value of the engine speed sensor 35, whether or not the rotation speed of the engine 10 is suddenly increased and reduced (Step F13 in FIG. 11). In FIG. 11, "E/Grpm" is the rotation speed of the engine 10, and "sudden change" is that the rotation speed of the engine 10 is suddenly increased and reduced. If the rotation speed of the engine 10 is suddenly increased and reduced (YES in Step F13 in FIG. 11), the ECU 31 changes the number of sudden change times (indicating the number of times in which the rotation speed of the engine 10 is suddenly increased and reduced) from an initial value of 0 to 1, and starts measuring an elapsed time from the time of the change (Step F14 in FIG. 11).

The ECU 31 monitors whether or not the rotation speed of the engine 10 is suddenly increased and reduced while measuring the elapsed time from the time at which the number of sudden change times is changed to 1, and determines whether or not the number of sudden change times exceeds a second smooth water determination upper limit value which is an integer of not less than 2 (Step F15 in FIG. 11). If the number of sudden change times does not exceed the second smooth water determination upper limit value (NO in Step F15 in FIG. 11), the ECU 31 checks whether or not a second smooth water determination period elapses from the time at which the number of sudden change times is changed to 1 (Step F18 in FIG. 11). If the second smooth water determination period does not elapse (NO in Step F18 in FIG. 11), the ECU 31 checks again whether or not the number of sudden change times exceeds the second smooth water determination upper limit value (back to Step F15 in FIG. 11).

If the number of sudden change times exceeds the second smooth water determination upper limit value before the lapse of the second smooth water determination period from the time at which the number of sudden change times is changed to 1 (YES in Step F15 in FIG. 11), the ECU 31 determines that the water surface is not smooth (Step F16 in FIG. 11). Further, the ECU 31 starts measuring the elapsed time from the time of the determination that the water surface is not smooth (Step F17 in FIG. 11). Thereafter, the ECU 31 ends the process shown in FIG. 11, and repeats the process sequence from Step F11 in FIG. 11.

In the constant speed traveling determination operation, if it is determined that the watercraft 1 does not continuously travel forward at a constant speed (NO in Step F12 in FIG. 11), the ECU 31 determines that the water surface is smooth (Step F19 in FIG. 11). If the watercraft 1 continuously travels forward at a constant speed (YES in Step F12 in FIG. 11) but, during the monitoring by the ECU 31, the rotation speed of the engine 10 is not suddenly increased and reduced (NO in Step F13 in FIG. 11), the ECU 31 also determines that the water surface is smooth (Step F19 in FIG. 11). If the number of sudden change times is not greater than the second smooth water determination upper limit value before the lapse of the second smooth water determination period (YES in Step F18 in FIG. 11), the ECU 31 also determines that the water surface is smooth (Step F19 in FIG. 11).

If the water surface determination status in the ECU 31 is ROUGH (NO in Step F11 in FIG. 11), the ECU 31 also performs the constant speed traveling determination operation. In the constant speed traveling determination operation, if it is determined that the watercraft 1 does not continuously travel forward at a constant speed (NO in Step F20 in FIG. 11), the ECU 31 determines that the water surface is smooth (Step F19 in FIG. 11). In the constant speed traveling determination operation, if it is determined that the watercraft 1 continuously travels forward at a constant speed (YES in Step F20 in FIG. 11), the ECU 31 monitors whether or not the rotation speed of the engine 10 is suddenly increased and reduced before the lapse of a second rough water determination cancellation period from the time of the determination that the water surface is not smooth (Step F21 in FIG. 11). That is, the ECU 31 monitors whether or not the rotation speed of the engine 10 is suddenly increased and reduced before the lapse of the second rough water determination cancellation period from the start of the measurement of the elapsed time in Step F17 in FIG. 11 (Step F21 in FIG. 11).

If the rotation speed of the engine 10 is suddenly increased and reduced before the lapse of the second rough water determination cancellation period (YES in Step F21 in FIG. 11), the elapsed time from the time of the determination that the water surface is not smooth is initialized to the initial value by the ECU 31 (Step F22 in FIG. 11), and the ECU 31 starts again the measurement of the elapsed time. If the rotation speed of the engine 10 does not suddenly increase and reduce before the lapse of the second rough water determination cancellation period (NO in Step F21 in FIG. 11), the ECU 31 determines that the water surface is smooth (Step F19 in FIG. 11).

Figure 12A:
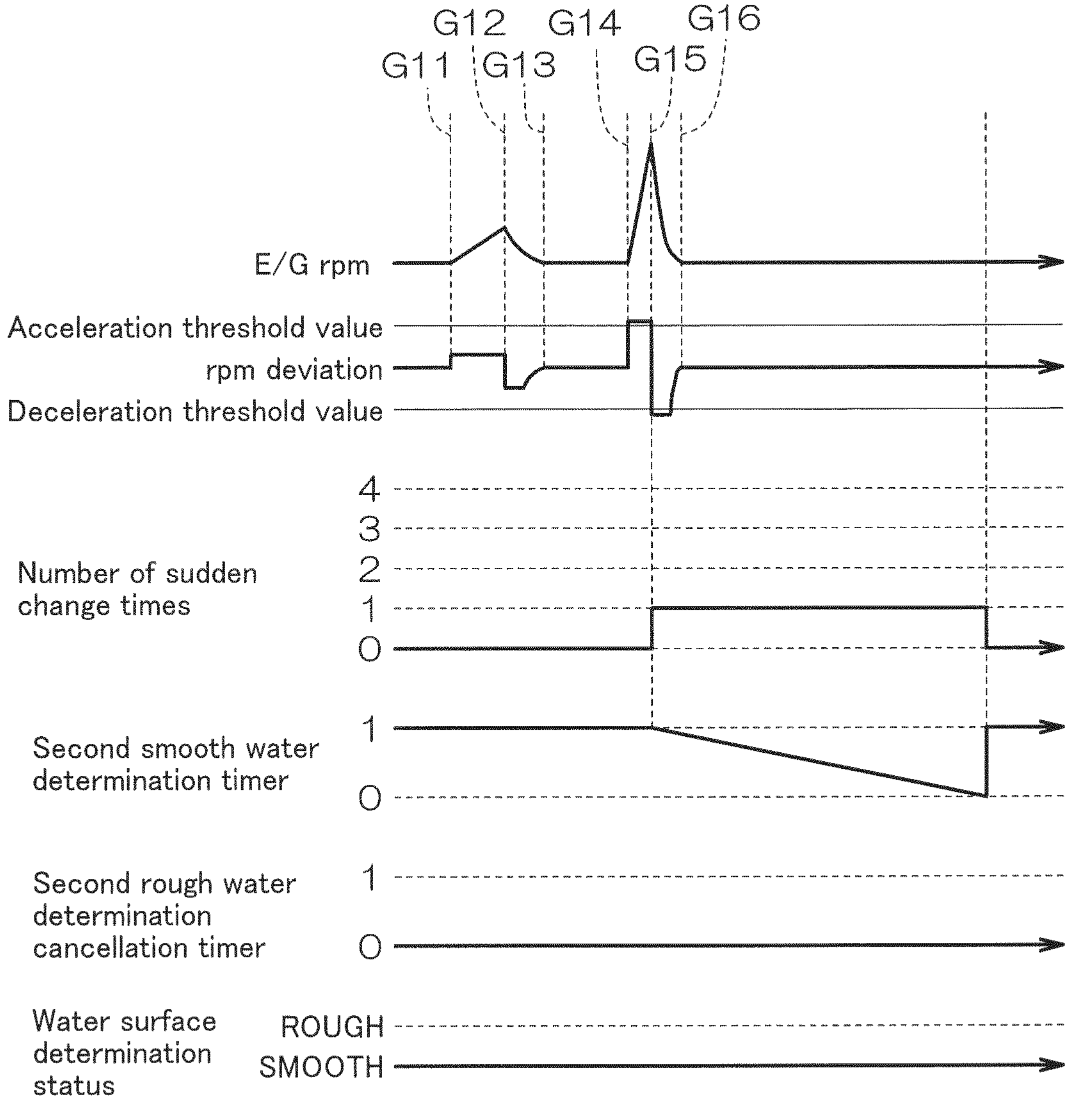
FIG. 12A is a time chart showing an exemplary process to be performed when it is determined that the water surface is smooth in the second smooth water determination operation.

FIG. 12A is a time chart showing an exemplary process to be performed when it is determined that the water surface is smooth in the second smooth water determination operation. In FIG. 12A, "E/Grmp" indicates the rotation speed of the engine 10, and "rpm deviation" indicates the change rate of the rotation speed of the engine 10. These definitions apply to FIGS. 12B and 12C as well. The change rate of the rotation speed of the engine 10 corresponds to the acceleration of the engine 10.

The ECU 31 determines, based on the detection value of the engine speed sensor 35, whether or not the rotation speed of the engine 10 is suddenly increased and reduced. FIG. 12A shows an exemplary case in which the ECU 31 determines, based on the acceleration of the engine 10 ("rpm deviation" in FIG. 12A), whether or not the water surface is smooth. In FIG. 12A, "Acceleration threshold value" is a threshold value for the increase rate of the rotation speed of the engine 10, and "Deceleration threshold value" is a threshold value for the reduction rate of the rotation speed of the engine 10. These definitions apply to FIGS. 12B and 12C as well.

In the exemplary case shown in FIG. 12A, the ECU 31 determines whether or not the rotation speed of the engine 10 is suddenly increased or reduced based on whether or not the acceleration of the engine 10 falls within a normal traveling range which ranges from the acceleration threshold value to the deceleration threshold value. The acceleration threshold value is a positive value, while the deceleration threshold value is a negative value. When the rotation speed of the engine 10 is increased, the acceleration of the engine 10 has a positive value. When the rotation speed of the engine 10 is reduced, the acceleration of the engine 10 has a negative value.

In the exemplary case shown in FIG. 12A, the rotation speed of the engine 10 is increased during a period from time G11 to time G12, and is reduced during a period from time G12 to time G13. From time G11 to time G12, the acceleration of the engine 10 is smaller than the acceleration threshold value. From time G12 to time G13, the acceleration of the engine 10 is greater than the deceleration threshold value. Therefore, the ECU 31 determines that the rotation speed of the engine 10 is not suddenly increased and reduced during a period from time G11 to time G13.

In the exemplary case shown in FIG. 12A, the rotation speed of the engine 10 is increased during a period from time G14 to time G15, and is reduced during a period from time G15 to time G16. From time G14 to time G15, the acceleration of the engine 10 is greater than the acceleration threshold value. From time G15 to time G16, the acceleration of the engine 10 is smaller than the deceleration threshold value. Therefore, the ECU 31 determines that the rotation speed of the engine 10 is suddenly increased and reduced during a period from time G14 to time G16.

If it is determined that the rotation speed of the engine 10 is suddenly increased and reduced, the ECU 31 changes the number of sudden change times (indicating the number of times in which the rotation speed of the engine 10 is suddenly increased and reduced) from an initial value of 0 to 1, and starts measuring the elapsed time from the time of the change. In FIG. 12A, when the number of sudden change times is changed to 1, the ECU 31 actuates a second smooth water determination timer by way of example. The value of the second smooth water determination timer is changed from an initial value to an end value before the lapse of the second smooth water determination period from the actuation of the timer. In the exemplary case shown in FIG. 12A, the initial value of the second smooth water determination timer is 1, and the end value of the second smooth water determination timer is 0.

After the start of the measurement of the elapsed time, the ECU 31 continuously monitors whether or not the rotation speed of the engine 10 is suddenly increased and reduced, and counts the number of sudden change times. If the number of sudden change times exceeds the second smooth water determination upper limit value before the lapse of the second smooth water determination period from the time at which the number of sudden change times is changed to 1, the ECU 31 determines that the water surface is not smooth. In FIG. 12A, the number of sudden change times is 1 after the lapse of the second smooth water determination period by way of example. In the exemplary case shown in FIG. 12A, the second smooth water determination upper limit value is 3. In this exemplary case, therefore, the ECU 31 determines that the water surface is smooth.

Figure 12B:
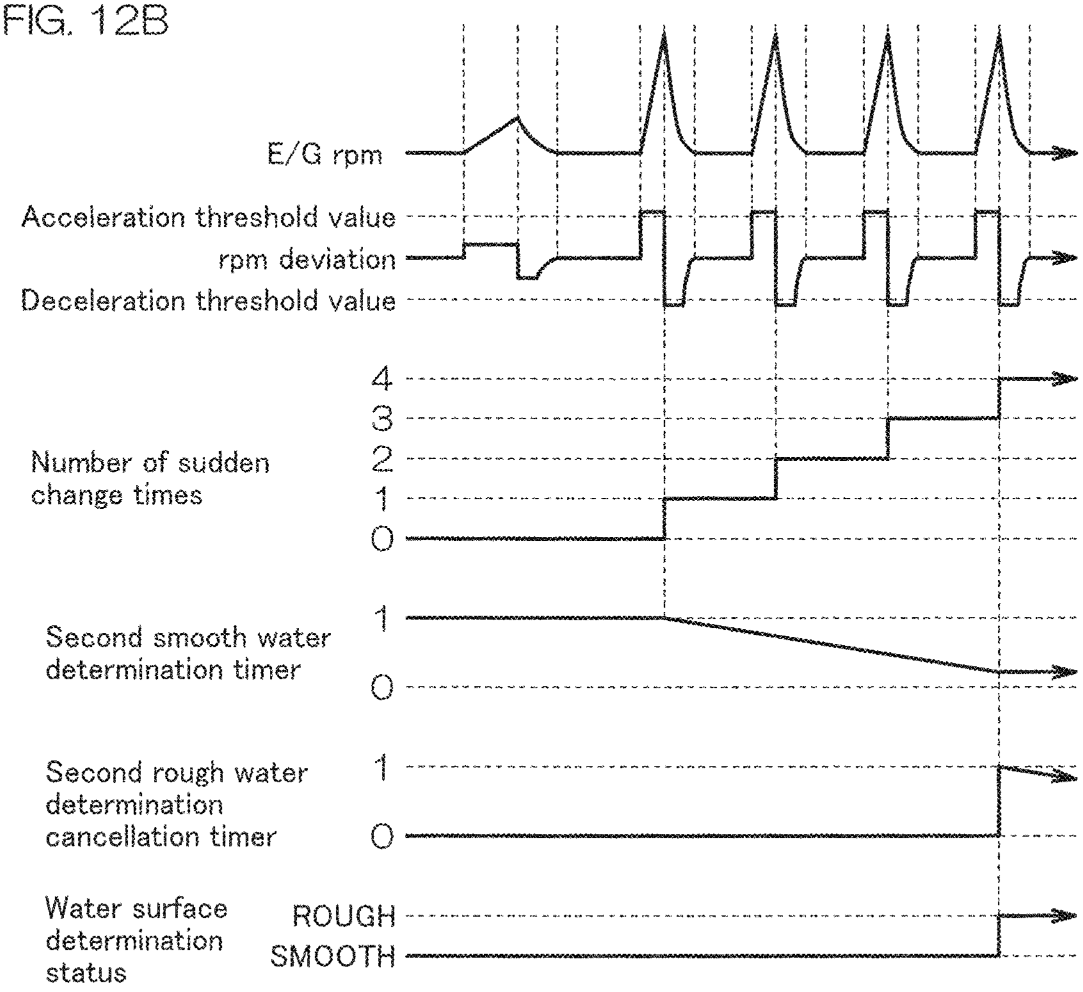
FIG. 12B is a time chart showing another exemplary process to be performed when it is determined that the water surface is not smooth in the second smooth water determination operation.

FIG. 12B is a time chart showing another exemplary process to be performed when it is determined that the water surface is not smooth in the second smooth water determination operation.

As in the exemplary case shown in FIG. 12A, if it is determined that the rotation speed of the engine 10 is suddenly increased and reduced, the ECU 31 changes the number of sudden change times (indicating the number of times in which the rotation speed of the engine 10 is suddenly increased and reduced) from an initial value of 0 to 1, and causes the second smooth water determination timer to measure the elapsed time from the time of the change. Thereafter, the ECU 31 counts the number of sudden change times, while causing the second smooth water determination timer to measure the elapsed time.

FIG. 12B shows an exemplary case in which the number of sudden change times reaches 4 before the lapse of the second smooth water determination period. In the exemplary case shown in FIG. 12B, the second smooth water determination upper limit value is 3. In this exemplary case, therefore, the number of sudden change times exceeds the second smooth water determination upper limit value before the lapse of the second smooth water determination period. When the number of sudden change times exceeds the second smooth water determination upper limit value, the ECU 31 determines that the water surface is not smooth, and changes the status from SMOOTH to ROUGH in the second smooth water determination operation.

Figure 12C:
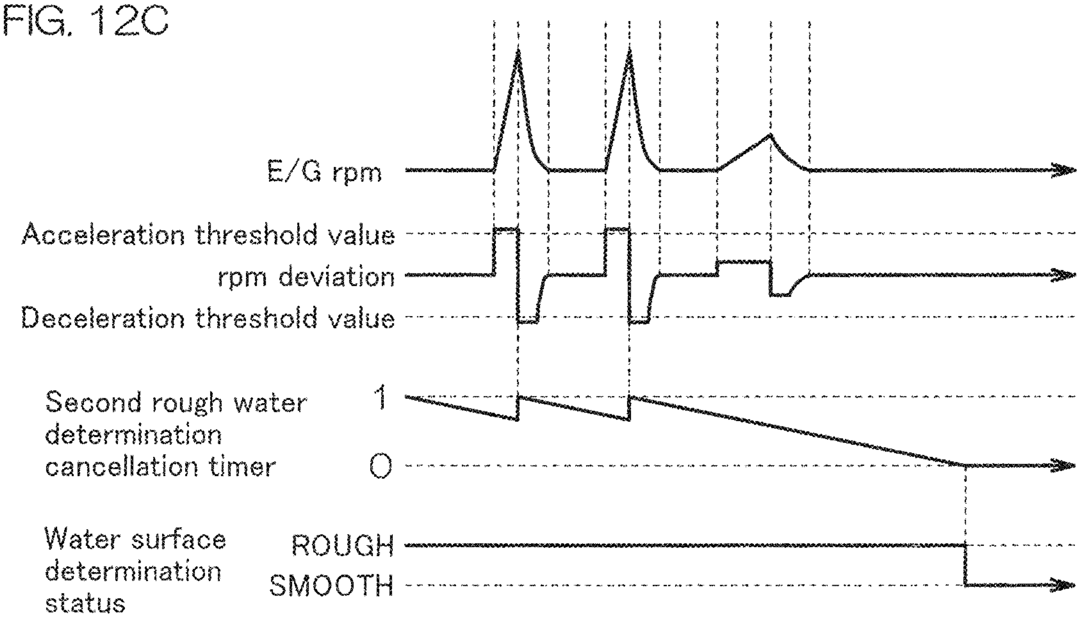
FIG. 12C is a time chart showing still another exemplary process to be performed when it is determined that the water surface is smooth after the determination that the water surface is not smooth in the second smooth water determination operation.

FIG. 12C is a time chart showing still another exemplary process to be performed when it is determined that the water surface is smooth after the determination that the water surface is not smooth in the second smooth water determination operation.

When the ECU 31 determines that the water surface is not smooth, the ECU 31 starts measuring the elapsed time from the time of the determination that the water surface is not smooth. FIG. 12C shows an exemplary case in which the ECU 31 actuates a second rough water determination cancellation timer when the ECU 31 determines that the water surface is not smooth. The value of the second rough water determination cancellation timer is changed from an initial value to an end value before the lapse of the second rough water determination cancellation period from the actuation of the timer. In the exemplary case shown in FIG. 12C, the initial value of the second rough water determination cancellation timer is 1, and the end value of the second rough water determination cancellation timer is 0.

After the start of the measurement of the elapsed time, the ECU 31 continuously monitors whether or not the rotation speed of the engine 10 is suddenly increased and reduced. If the rotation speed of the engine 10 is suddenly increased and reduced before the lapse of the second rough water determination cancellation period from the time at which the ECU 31 determines that the water surface is not smooth, the ECU 31 initializes the value of the second rough water determination cancellation timer to an initial value of 1, and causes the second rough water determination cancellation timer to start again the measurement of the time. In FIG. 12C, the rotation speed of the engine 10 is suddenly increased and reduced twice, and resets the second rough water determination cancellation timer twice by way of example.

If the rotation speed of the engine 10 is not suddenly increased and reduced before the lapse of the second rough water determination cancellation period from the time at which the ECU 31 determines that the water surface is not smooth, the ECU 31 determines that the water surface is smooth. That is, the ECU 31 determines that the water surface is changed into the smooth water state, or that the watercraft 1 is moved from the rough water region into the smooth water region. In this case, the ECU 31 changes the status back to SMOOTH in the second smooth water determination operation. Further, the ECU 31 initializes the number of sudden change times to an initial value of 0.

Next, the constant speed traveling determination operation will be described.

Figure 13:
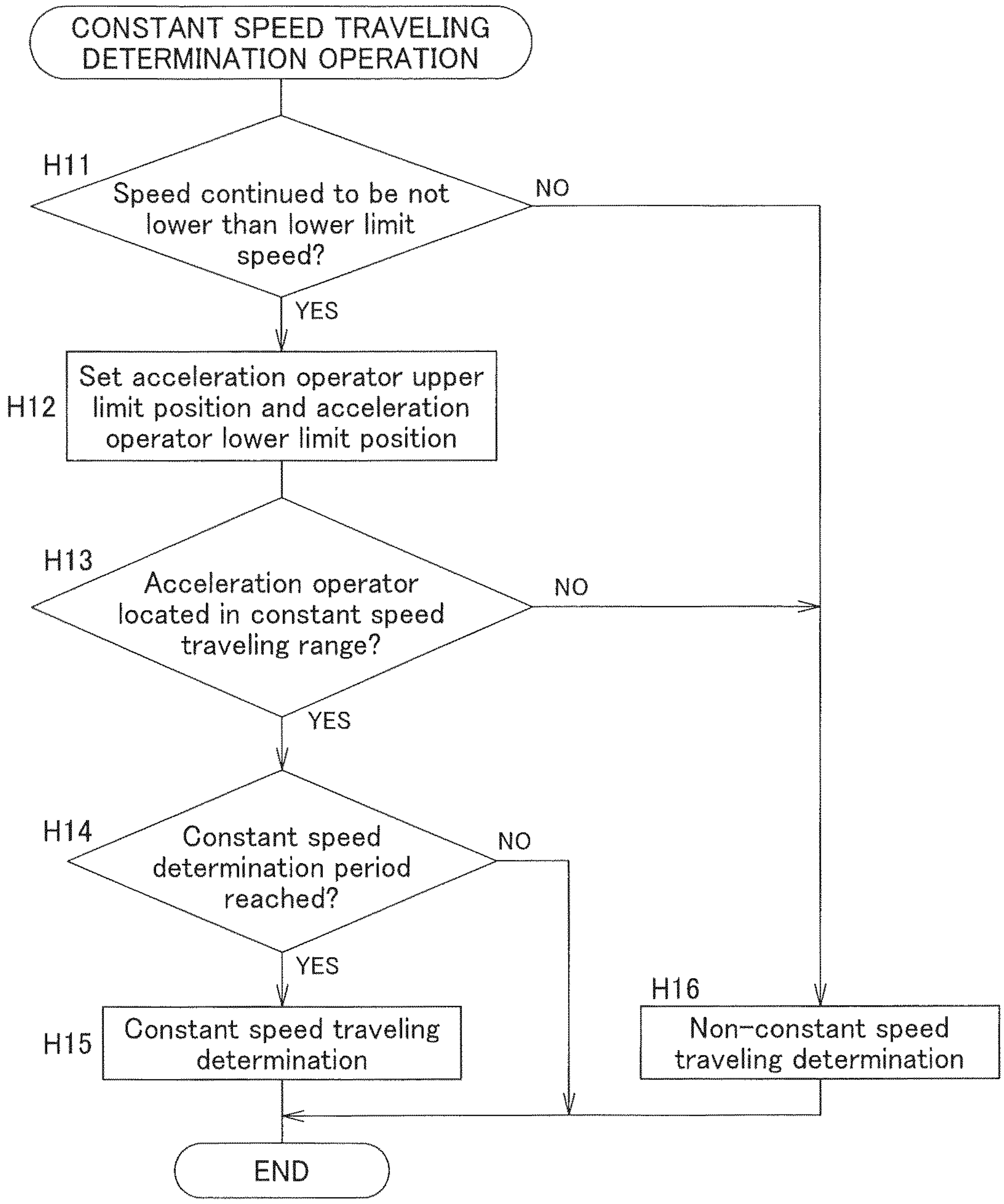
FIG. 13 is a flowchart showing an exemplary constant speed traveling determination operation to be performed to determine whether or not the watercraft continuously travels forward at a constant speed.

FIG. 13 is a flowchart showing an example of the constant speed traveling determination operation to be performed to determine whether or not the watercraft 1 continuously travels forward at a constant speed.

In the constant speed traveling determination operation, the ECU 31 determines whether or not the watercraft 1 continuously travels forward at a speed not lower than the lower limit speed for a period not shorter than the predetermined period (Step H11 in FIG. 13). If the watercraft 1 continuously travels forward at a speed not lower than the lower limit speed for a period not shorter than the predetermined period (YES in Step H11 in FIG. 13), the ECU 31 sets an acceleration operator upper limit position and an acceleration operator lower limit position according to the current watercraft speed (Step H12 in FIG. 13).

A range from the acceleration operator upper limit position to the acceleration operator lower limit position is defined as the constant speed traveling range. After the ECU 31 sets the constant speed traveling range according to the watercraft speed (Step H12 in FIG. 13), the ECU 31 determines, based on the detection value of the acceleration operator position sensor 33, whether or not the acceleration operator 7 is held in the constant speed traveling range (Step H13 in FIG. 13). If the acceleration operator 7 is held in the constant speed traveling range (YES in Step H13 in FIG. 13), the ECU 31 determines whether or not an acceleration operator holding period (indicating a period during which the acceleration operator 7 is continuously held in the constant speed traveling range) reaches a constant speed determination period (Step H14 in FIG. 13).

If the acceleration operator holding period reaches the constant speed determination period (YES in Step H14 in FIG. 13), the ECU 31 determines that the watercraft 1 continuously travels forward at a constant speed (Step H15 in FIG. 13). If the acceleration operator holding period does not reach the constant speed determination period (NO in Step H14 in FIG. 13), the ECU 31 ends the process shown in FIG. 13, and repeats the process sequence from Step H11 in FIG. 13. In this case, if the acceleration operator 7 is held within the constant speed traveling range, the ECU 31 checks again, after a lapse of a predetermined period, whether or not the acceleration operator holding period reaches the constant speed determination period (Step H14 in FIG. 13).

If the watercraft 1 does not continuously travel forward at a speed not lower than the lower limit speed for a period not shorter than the predetermined period (NO in Step H11 in FIG. 13), or if the acceleration operator 7 is not held in the constant speed traveling range (NO in Step H13 in FIG. 13), the ECU 31 determines that the watercraft 1 does not continuously travel forward at a constant speed (Step H16 in FIG. 13). Thereafter, the ECU 31 ends the process shown in FIG. 13, and repeats the process sequence from Step H11 in FIG. 13.

Figure 14:
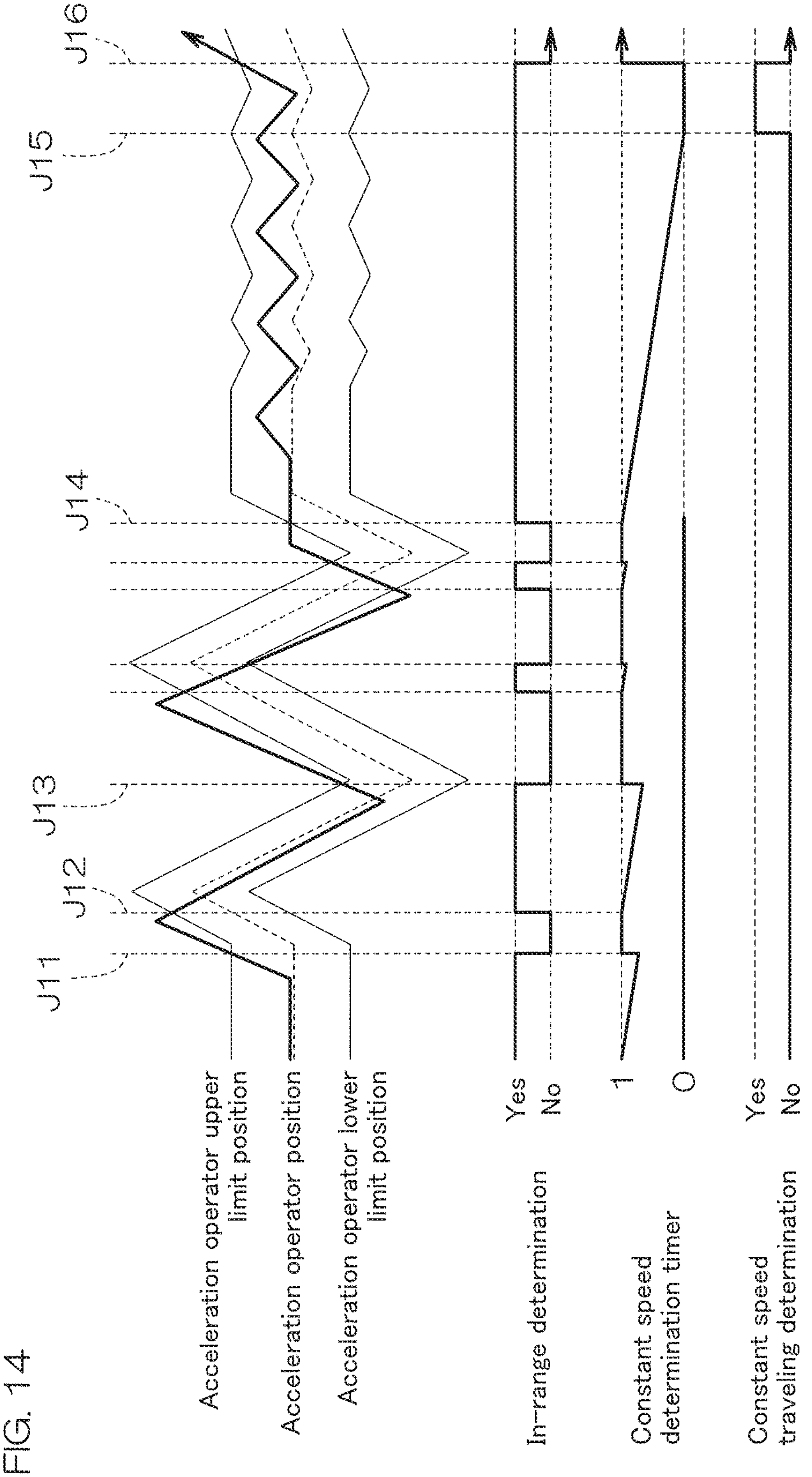
FIG. 14 is a time chart showing an exemplary process for the constant speed traveling determination operation.

FIG. 14 is a time chart showing an exemplary process for the constant speed traveling determination operation.

When the watercraft 1 travels forward at a speed not lower than the lower limit speed for a period not shorter than the predetermined period, the ECU 31 sets the acceleration operator upper limit position and the acceleration operator lower limit position according to the watercraft speed, and determines whether or not the acceleration operator 7 is held within the constant speed traveling range which ranges from the acceleration operator upper limit position to the acceleration operator lower limit position. The acceleration operator upper limit position and the acceleration operator lower limit position are between the maximum output position and the minimum output position (see FIG. 16).

In FIG. 14, the acceleration operator 7 is located between the maximum output position and the acceleration operator upper limit position during a period from time J11 to time J12, and then the acceleration operator 7 is moved to the acceleration operator upper limit position at time J12 by way of example. When the acceleration operator 7 is moved into the constant speed traveling range, the ECU 31 starts measuring the acceleration operator holding period which indicates a period during which the acceleration operator 7 is continuously held in the constant speed traveling range. FIG. 14 shows an exemplary case in which the ECU 31 actuates a constant speed determination timer at time J12. The value of the constant speed determination timer is changed from an initial value to an end value before the lapse of the constant speed determination period from the actuation of the timer. In the exemplary case shown in FIG. 14, the initial value of the constant speed determination timer is 1, and the end value of the constant speed determination timer is 0.

In the exemplary case shown in FIG. 14, the acceleration operator 7 is moved into the constant speed traveling range at time J12, and the acceleration operator 7 is moved out of the constant speed traveling range at time J13. In FIG. 14, a period from time J12 to time J13 is shorter than the constant speed determination period by way of example. Therefore, the ECU 31 determines that the watercraft rider intentionally moves the acceleration operator 7 and the watercraft 1 does not continuously travel forward at a constant speed during the period from time J12 to time J13. In FIG. 14, "NO" for the constant speed traveling determination indicates that the ECU 31 determines that the watercraft 1 does not continuously travel forward at a constant speed.

In the exemplary case shown in FIG. 14, the acceleration operator 7 is moved into the constant speed traveling range at time J14, and the acceleration operator holding period matches the constant speed determination period at time J15. Therefore, the ECU 31 determines, at time J15, that the watercraft 1 continuously travels forward at a constant speed. In FIG. 14, "YES" for the constant speed traveling determination indicates that the ECU 31 determines that the watercraft 1 continuously travels forward at a constant speed.

In FIG. 14, the acceleration operator 7 is moved, but the acceleration operator 7 is maintained within the constant speed traveling range in a period from time J14 to time J15 by way of example. In the exemplary case shown in FIG. 14, the acceleration operator 7 is moved to the acceleration operator upper limit position at time J16 and, thereafter, the acceleration operator 7 is moved out of the constant speed traveling range. Therefore, the ECU 31 determines that the watercraft 1 does not continuously travel forward at a constant speed after time J16, and the constant speed traveling determination is changed from YES to NO in FIG. 14.

Figure 15:
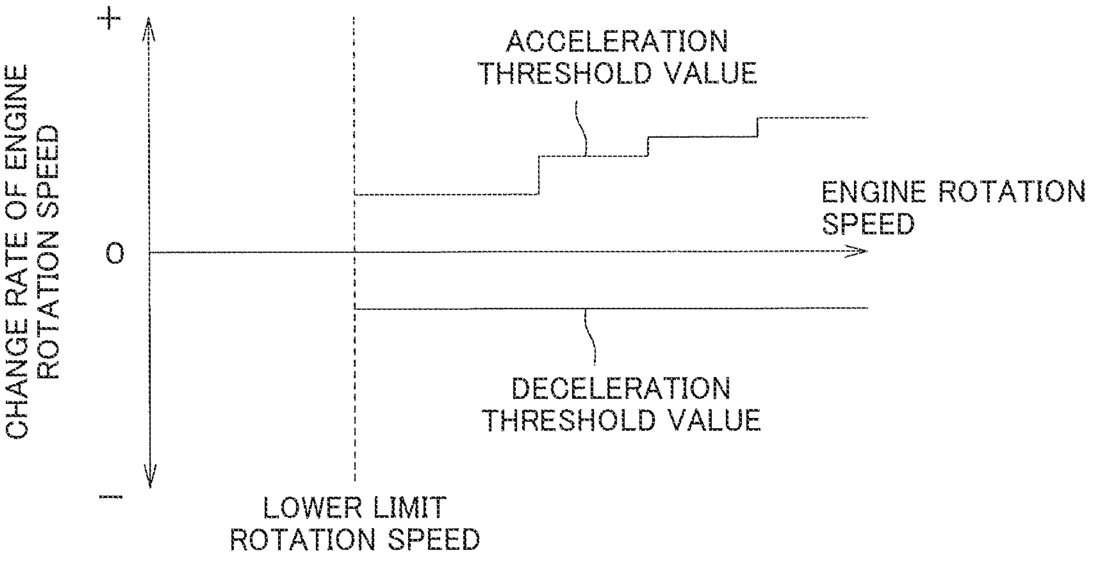
FIG. 15 is a graph showing an exemplary relationship between the rotation speed of an engine, and an acceleration threshold value, and a deceleration threshold value.

FIG. 15 is a graph showing an exemplary relationship between the rotation speed of the engine 10, and the acceleration threshold value and the deceleration threshold value.

The acceleration threshold value and the deceleration threshold value to be used in the second smooth water determination operation may be constant irrespective of the rotation speed of the engine 10, or may be changed according to the rotation speed of the engine 10. Further, one of the acceleration threshold value and the deceleration threshold value may be constant irrespective of the rotation speed of the engine 10, and the other of the acceleration threshold value and the deceleration threshold value may be changed according to the rotation speed of the engine 10.

FIG. 15 shows an exemplary case in which the acceleration threshold value (positive value) is increased stepwise as the rotation speed of the engine 10 increases, and the deceleration threshold value (negative value) is kept constant irrespective of the rotation speed of the engine 10. The width of the normal traveling range indicating the range from the acceleration threshold value to the deceleration threshold value is increased stepwise as the rotation speed of the engine 10 increases. The acceleration threshold value and the deceleration threshold value may be continuously increased or reduced as the rotation speed of the engine 10 increases.

Even if the position of the acceleration operator 7 is kept unchanged, the rotation speed of the engine 10 is liable to fluctuate due to factors other than the wave conditions (e.g., cavitation occurring in the propulsion system 9, and the like). The fluctuation tends to be increased as the rotation speed of the engine 10 increases. In addition, the fluctuation is often smaller than the fluctuation in the rotation speed of the engine 10 occurring when the watercraft 1 travels forward in the rough water region. Therefore, incorrect determination that the water surface is not smooth is able to be prevented by increasing the width of the normal traveling range stepwise or continuously as the rotation speed of the engine 10 increases.

Figure 16:
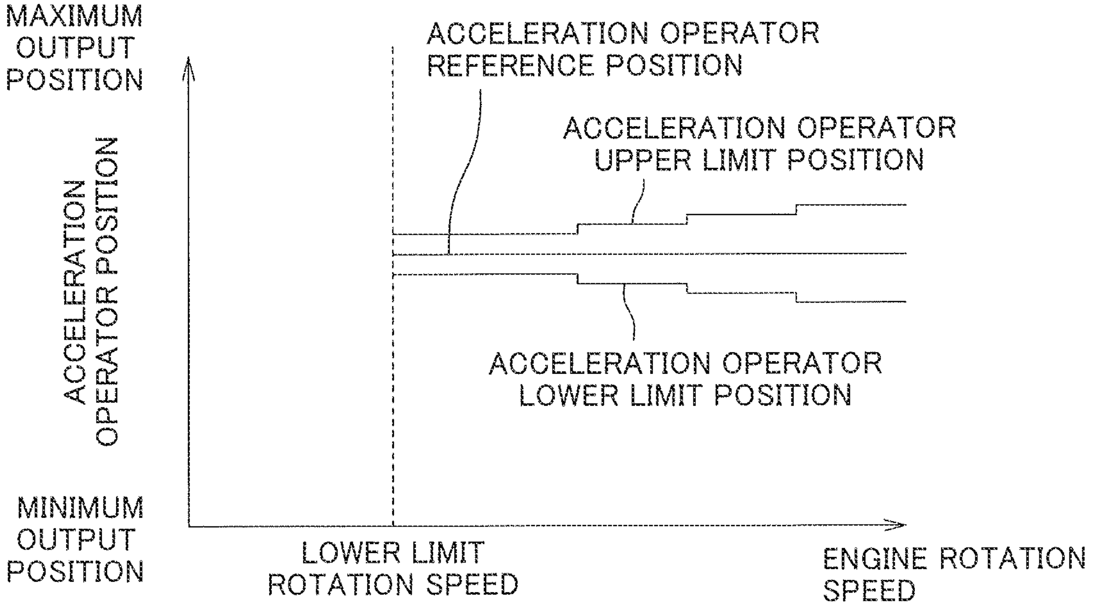
FIG. 16 is a graph showing an exemplary relationship between the rotation speed of the engine, and an acceleration operator upper limit position, and an acceleration operator lower limit position.

FIG. 16 is a graph showing an exemplary relationship between the rotation speed of the engine 10, and the acceleration operator upper limit position and the acceleration operator lower limit position.

The ECU 31 sets an acceleration operator reference position corresponding to the current position of the acceleration operator 7 indicating the current detection value of the acceleration operator position sensor 33 based on the previous position of the acceleration operator 7 indicating the latest detection value of the acceleration operator position sensor 33. The ECU 31 may set the acceleration operator reference position based on the previous position of the acceleration operator 7 and the current position of the acceleration operator 7.

The acceleration operator upper limit position used in the constant speed traveling determination operation is a position such that the acceleration operator reference position is moved toward the maximum output position by an upper limit offset amount. The acceleration operator lower limit position used in the constant speed traveling determination operation is a position such that the acceleration operator reference position is moved toward the minimum output position by a lower limit offset amount. The upper limit offset amount and the lower limit offset amount may be equal to each other, or may be different from each other.

The acceleration operator upper limit position and the acceleration operator lower limit position are between the maximum output position and the minimum output position. The acceleration operator upper limit position and the acceleration operator lower limit position are different from each other. A range from the acceleration operator upper limit position to the acceleration operator lower limit position is defined as the constant speed traveling range. The width of the constant speed traveling range, i.e., an angular difference between the acceleration operator upper limit position and the acceleration operator lower limit position, is smaller than an angular difference between the maximum output position and the acceleration operator upper limit position or an angular difference between the minimum output position and the acceleration operator lower limit position.

The acceleration operator upper limit position and the acceleration operator lower limit position may be kept constant irrespective of the rotation speed of the engine 10, or may be changed according to the rotation speed of the engine 10. Further, one of the acceleration operator upper limit position and the acceleration operator lower limit position may be kept constant irrespective of the rotation speed of the engine 10, and the other of the acceleration operator upper limit position and the acceleration operator lower limit position may be changed according to the rotation speed of the engine 10. FIG. 16 shows an exemplary case in which the acceleration operator upper limit position and the acceleration operator lower limit position are each changed according to the rotation speed of the engine 10.

In the exemplary case shown in FIG. 16, the upper limit offset amount and the lower limit offset amount are increased stepwise as the rotation speed of the engine 10 increases. The width of the constant speed traveling range is increased stepwise as the rotation speed of the engine 10 increases. The upper limit offset amount and the lower limit offset amount may be continuously increased as the rotation speed of the engine 10 increases. Therefore, the width of the constant speed traveling range may be increased stepwise as the rotation speed of the engine 10 increases.

Even if the watercraft 1 travels forward in the smooth water region, the watercraft rider is often liable to slightly move the acceleration operator 7 due to vibrations of the watercraft 1. In this case, the movement of the acceleration operator 7 is increased as the watercraft speed increases, i.e., as the movement amount of the acceleration operator 7 from the minimum output position increases. By increasing the width of the constant speed traveling range stepwise or continuously as the rotation speed of the engine 10 increases, the ECU 31 is prevented from incorrectly determining, due to the movement of the acceleration operator 7, that the watercraft 1 does not continuously travel forward at a constant speed.

In a preferred embodiment of the present invention, as described above, the wave conditions are detected by the capsize sensor 39 and the engine speed sensor 35 which are examples of the wave detector. The ECU 31 which is an example of the controller determines, based on the detection values of the capsize sensor 39 and the engine speed sensor 35, whether or not the water surface is smooth and, if it is determined that the water surface is not smooth, the ECU 31 transmits the command to increase the trim angle of the deflector 17 to the trim actuator 20. Upon reception of this command, the trim actuator 20 increases the trim angle to move the bow B1 upward with respect to the stern S1. This makes it possible to reduce the water splash occurring during the forward traveling of the watercraft 1. Thus, the trim of the watercraft 1 is able to be automatically changed according to the detected wave conditions, thus improving the riding comfort on the watercraft 1.

In a preferred embodiment of the present invention, when it is determined that the water surface is smooth after the determination that the water surface is not smooth, the ECU 31 causes the trim actuator 20 to reduce the trim angle to move the bow B1 downward with respect to the stern S1. That is, the ECU 31 controls the trim angle so as to move the bow B1 upward and then downward according to the wave conditions. This eliminates the possibility that the bow 1 is kept in the raised state while the watercraft 1 travels forward in the smooth water region in which the water surface is smooth.

In a preferred embodiment of the present invention, when it is determined that the water surface is not smooth, the ECU 31 stores the trim angle value of the deflector 17, and then controls the trim actuator 20 to increase the trim angle. Thus, the bow B1 is moved upward with respect to the stern S1. When it is thereafter determined that the water surface is smooth, the ECU 31 controls the trim actuator 20 to reduce the trim angle to the stored value. Thus, the bow B1 is moved downward with respect to the stern S1. Therefore, the trim angle of the deflector 17 is returned to the previous value before it was determined that the water surface is not smooth.

In a preferred embodiment of the present invention, even if waves are rough when the ECU 31 determines that the watercraft 1 travels forward at a low speed, the ECU 31 does not change the trim angle of the deflector 17 but maintains the trim angle at the current value. When the watercraft 1 slowly travels forward, the water splashes a little even in the rough waves. In other words, it is substantially unnecessary to change the trim angle in order to reduce the water splash when the watercraft 1 travels forward at a low speed. Therefore, the unnecessary trim angle change is avoided by determining whether the watercraft speed is not lower than the lower limit speed.

In a preferred embodiment of the present invention, when the watercraft rider operates the trim button 41, the ECU 31 controls the trim actuator 20 to change the trim angle in the range not greater than the manual upper limit angle, i.e., in the range from the second up position U2 to the second down position D2. Thus, the bow B1 is moved upward or downward with respect to the stern S1. On the other hand, if the ECU 31 determines that the water surface is not smooth, the ECU 31 controls the trim actuator 20 to increase the trim angle to an angle that is greater than the manual upper limit angle. Specifically, the ECU 31 moves the deflector 17 to the third up position U3. Therefore, the bow B1 is moved upward to a higher level with respect to the stern S1 than when the trim angle is the manual upper limit angle. Thus, the water splash against the watercraft rider is reduced.

In a preferred embodiment of the present invention, if the ECU 31 determines that the water surface is not smooth but the watercraft rider performs the trim down operation on the trim button 41, the ECU 31 controls the trim actuator 20 to reduce the trim angle to move the bow B1 downward with respect to the stern S1. That is, even if the actual water surface is not smooth, the ECU 31 prioritizes the watercraft rider's command to move the bow B1 downward. Thus, the trim of the watercraft 1 is able to match or approach a trim state intended by the watercraft rider.

In a preferred embodiment of the present invention, if the watercraft rider performs the trim down operation on the trim button 41 after the ECU 31 increases the trim angle based on the determination that the water surface is not smooth, the ECU 31 reduces the trim angle and, at the same time, prohibits the trim angle from being increased to the previous value observed before the reduction. This prevents the trim angle from being automatically increased despite the operation performed by the watercraft rider to reduce the trim angle.

In a preferred embodiment of the present invention, the rotation speed of the engine 10 is detected by the engine speed sensor 35. When the watercraft 1 travels forward in the rough water region in which the water surface is not smooth, the water resistance applied to the engine 10 is liable to be repeatedly reduced and increased, thus repeatedly and suddenly increasing and reducing the rotation speed of the engine 10. When the watercraft 1 travels forward in the smooth water region in which the water surface is smooth, the sudden increase and reduction in the rotation speed of the engine is less liable to occur.

The capsize sensor 39 which is an example of the ON/OFF sensor is turned on and off according to the vertical acceleration of the hull 3. When the watercraft 1 travels forward in the rough water region, the hull 3 is liable to repeatedly experience instantaneous reciprocal upward and downward movement. At this time, the downward inertial force and the upward inertial force are often alternately applied to the capsize sensor 39, such that the capsize sensor 39 is repeatedly turned on and off. When the watercraft 1 travels forward in the smooth water region, the capsize sensor 39 is less liable to be turned on and off.

Therefore, the ECU 31 is able to determine whether or not the water surface is smooth by monitoring at least one of the detection value of the capsize sensor 39 and the detection value of the engine speed sensor 35. Further, the engine speed sensor 35 is an important sensor provided in watercrafts including engines. The ON/OFF sensor, such as the capsize sensor 39, is provided in most watercrafts. Therefore, the wave conditions are able to be determined by utilizing the existing sensors without providing an additional device such as a camera.

In a preferred embodiment of the present invention, the ECU 31 performs the first smooth water determination operation to determine, based on the detection value of the capsize sensor 39, whether or not the water surface is smooth without consideration of the detection value of the engine speed sensor 35. Further, the ECU 31 performs the second smooth water determination operation to determine, based on the detection value of the engine speed sensor 35, whether or not the water surface is smooth without consideration of the detection value of the capsize sensor 39. Therefore, the reliability of the determination is improved as compared with a case in which only one of the first smooth water determination operation and the second smooth water determination operation is performed. Further, the determination method is simplified as compared with a case in which the determination on whether or not the water surface is smooth is based on both of the detection values.

Depending upon the wave conditions and the like, it is sometimes incorrectly determined that the water surface is smooth in one of the first smooth water determination operation and the second smooth water determination operation when the actual water surface is not smooth. When it is determined, in at least one of the first smooth water determination operation and the second smooth water determination operation, that the water surface is not smooth, the ECU 31 finally determines that the water surface is not smooth. Therefore, the ECU 31 more reliably determines that the water surface is not smooth.

When the actual water surface is smooth, it is determined, in both of the first smooth water determination operation and the second smooth water determination operation, that the water surface is smooth. The ECU 31 does not finally determine that the water surface is smooth, if it is determined in only one of the first smooth water determination operation and the second smooth water determination operation that the water surface is smooth, but finally determines that the water surface is smooth only when it is determined in both of the first smooth water determination operation and the second smooth water determination operation that the water surface is smooth. Therefore, the ECU 31 is prevented from incorrectly determining that the water surface is smooth, in spite of the fact that the actual water surface is not smooth.

In a preferred embodiment of the present invention, even if the actual water surface is not smooth when the ECU 31 determines that the watercraft 1 travels forward at a low speed, the ECU 31 determines that the water surface is smooth. When the watercraft 1 travels forward at a low speed, the riding comfort of the watercraft 1 is less liable to be influenced by the wave conditions than when the watercraft 1 travels forward at a high speed. This makes it possible to simplify the determination method of determining whether or not the water surface is smooth while preventing or minimizing deterioration in the riding comfort.

In a preferred embodiment of the present invention, the position of the acceleration operator 7 operated by the watercraft rider is detected by the acceleration operator position sensor 33. If the watercraft rider maintains the acceleration operator 7 at a constant position or practically does not move the acceleration operator 7, the ECU 31 determines that the acceleration operator 7 is maintained within the constant speed traveling range. Only when this determination is made, the ECU 31 determines, based on the detection value of the engine speed sensor 35, whether or not the water surface is smooth. This prevents the ECU 31 from making an incorrect determination that the water surface is not smooth, which is attributable to a sudden change in the rotation speed of the engine 10 when the acceleration operator 7 is operated.

In a preferred embodiment of the present invention, when the watercraft rider intentionally and significantly moves the acceleration operator 7, the ECU 31 determines that the acceleration operator 7 is not maintained within the constant speed traveling range, and determines that the water surface is smooth. When the watercraft rider suddenly moves the acceleration operator 7, the rotation speed of the engine 10 is suddenly changed. In this case, the ECU 31 cannot determine whether the sudden change in rotation speed is attributable to the operation of the acceleration operator 7 or to the wave conditions, and sometimes incorrectly determines that the water surface is not smooth, in spite of the fact that the water surface is calm. When the determination that the water surface is smooth is made when it is determined that the acceleration operator 7 is not maintained within the constant speed traveling range, the incorrect determination is avoided.

In a preferred embodiment of the present invention, the determination on whether or not the watercraft rider intentionally moves the acceleration operator 7 is based on the constant speed traveling range, and the width of the constant speed traveling range is increased as the rotation speed of the engine 10 increases. Even if the watercraft 1 travels forward in the smooth water region, the watercraft 1 is liable to vibrate during the forward traveling of the watercraft 1. Due to the vibrations of the watercraft 1, the watercraft rider often slightly moves the acceleration operator 7. The movement of the acceleration operator 7 is liable to be increased as the rotation speed of the engine 10 increases. Therefore, the width of the constant speed traveling range is increased with the increase in the rotation speed of the engine 10 to reduce the possibility that the ECU 31 incorrectly determines, due to the movement of the acceleration operator 7, that the watercraft 1 does not travel forward at a constant speed.

In a preferred embodiment of the present invention, the ECU 31 does not determine that the water surface is not smooth, immediately after the capsize sensor 39 is turned on and off, but counts the number of ON/OFF times in which the capsize sensor 39 is reciprocally switched between ON and OFF. Only when the number of ON/OFF times exceeds the upper limit value within the predetermined period, the ECU 31 determines that the water surface is not smooth. Therefore, when the capsize sensor 39 is accidentally turned on and off only once, the ECU 31 is prevented from determining that the water surface is not smooth. Further, the determination on whether or not the water surface is smooth is more reliably made in consideration of not only the number of ON/OFF times but also the period of time.

In a preferred embodiment of the present invention, the change rate of the rotation speed of the engine 10, i.e., the acceleration of the engine 10, is calculated, and the change in the acceleration of the engine 10 is monitored. When the rotation speed of the engine 10 is suddenly changed, the absolute value of the acceleration of the engine 10 is increased. When only the change in the rotation speed of the engine 10 is monitored, on the other hand, it is impossible to determine whether or not the rotation speed of the engine 10 is changed in a short period of time. Therefore, the sudden change in the rotation speed of the engine 10 is reliably detected by monitoring the change in the acceleration of the engine 10.

In a preferred embodiment of the present invention, the determination on whether or not the water surface is smooth is made based on whether or not the acceleration of the engine 10 (the change rate of the rotation speed of the engine 10) is maintained within the normal traveling range. Further, the width of the normal traveling range is increased with the increase in the rotation speed of the engine 10. Even with the position of the acceleration operator 7 kept unchanged, the rotation speed of the engine 10 is sometimes fluctuated due to factors other than the wave conditions (e.g., due to uneven combustion or occurrence of cavitation). The fluctuation tends to be increased as the rotation speed of the engine 10 increases. In addition, the fluctuation is often smaller than the fluctuation in the rotation speed of the engine 10 occurring when the watercraft 1 travels forward in the rough water region. Therefore, the width of the normal traveling range is increased with the increase in the rotation speed of the engine 10, thus preventing the incorrect determination that the water surface is not smooth.

In a preferred embodiment of the present invention, the capsize sensor 39 is used as the ON/OFF sensor. When the hull 3 is capsized, the capsize sensor 39 is switched to the ON state or the OFF state. When the capsize sensor 39 is continuously maintained in the ON state or the OFF state, the ECU 31 determines that the hull 3 is capsized. The capsize sensor is provided in most watercrafts. Therefore, the wave conditions are able to be determined by using the capsize sensor 39 without providing an additional device such as a camera.

The present invention is not limited to the preferred embodiments described above, but various modifications may be made.

For example, the watercraft 1 may include an electric motor instead of the engine 10, or may include both the engine 10 and the electric motor. That is, a prime motor which generates power to propel the hull 3 may be the engine 10 or the electric motor, or may include both the engine 10 and the electric motor or any other motor.

The steering operator 6 is not limited to the bar handle including the two handle grips **6*g* and the handle bar, but may be a steering wheel, a joystick which doubles as the acceleration operator 7 and the reverse operator 8**, or any other types of operators.

Where the steering operator 6 is the steering wheel, the acceleration operator 7 may be a remote control lever which is pivotal about a horizontal axis and tiltable anteroposteriorly. The remote control lever may double as the reverse operator 8. The remote control lever is not necessarily required to be attached to the steering operator 6, as long as the remote control lever is located at a position at which the watercraft rider is able to operate it while operating the steering operator 6.

The watercraft 1 is not limited to the personal watercraft, but may be a jet boat including a steering wheel and a jet propulsion system, or may be an outboard motor boat including an outboard motor, or any other types of boats. That is, the propulsion system 9 is not limited to the jet propulsion system, but may be a propeller propulsion system which generates a propulsive force by rotating a propeller disposed in water, or any other types of propulsion systems such as a pod drive. The propeller propulsion system may include any of an inboard motor, an outboard motor, and an inboard/outboard motor.

The watercraft 1 may include a seat including a backrest to be brought into contact with the back of the watercraft rider instead of the seat 5 of saddle type to be straddled by the watercraft rider. In this case, the watercraft 1 may further include a side seat disposed on a lateral side of the seat 5, or may further include a rear seat disposed behind the seat 5. Both the side seat and the rear seat may be provided in the watercraft 1. If not necessary, the seat 5 may be eliminated from the watercraft 1.

The watercraft 1 may include an outboard motor or an inboard/outboard motor instead of or in addition to the jet propulsion system including the deflector 17 pivotal upward/downward and rightward/leftward with respect to the hull 3. In this case, the watercraft 1 may include a power trim tilt device (so-called PTT) corresponding to the trim actuator. That is, the ECU 31 is able to change the trim of the watercraft 1 by increasing or reducing the trim angle of the outboard motor or the inboard/outboard motor. The trim angle of the outboard motor or the inboard/outboard motor corresponds to the trim angle of the trim adjuster 21.

Where the propulsion system 9 is either the jet propulsion system or the propeller propulsion system, the watercraft 1 may include a trim tab movable upward and downward with respect to the hull 3, and a trim actuator which changes the angle of the trim tab with respect to the hull 3 by moving the trim tab with respect to the hull 3. In this case, the ECU 31 is able to change the trim of the watercraft 1 by causing the trim actuator to increase or reduce the angle of the trim tab with respect to the hull 3. The angle of the trim tab corresponds to the trim angle of the trim adjuster 21.

When the ECU 31 determines that the water surface is smooth after the determination that the water surface is not smooth, the ECU 31 may cause the trim actuator 20 to reduce the trim angle to a predetermined value rather than to reduce the trim angle to the stored value. When the ECU 31 determines that the water surface is smooth after the determination that the water surface is not smooth, the ECU 31 may cause the trim actuator 20 to keep the trim angle constant rather than to reduce the trim angle. Specifically, the ECU 31 may locate the deflector 17 at the third up position U3, even after it is determined that the water surface is smooth.

When the ECU 31 determines that the watercraft speed is lower than the lower limit speed, the ECU 31 may determine whether or not the water surface is smooth and, depending on the result of the determination, control the trim actuator 20 to change the trim angle.

The ECU 31 may move the deflector 17 to the third up position U3 according to the operation of the trim button 41. That is, the third up position U3 may be the manual upper limit angle. Alternatively, when the ECU 31 determines that the water surface is not smooth, the ECU 31 may control the trim actuator 20 to move the deflector 17 to the second up position U2. That is, the maximum trim angle position may be the second up position U2 rather than the third up position U3.

When the ECU 31 continuously determines that the water surface is not smooth and, in this state, the trim down operation is performed on the trim button 41, the ECU 31 may cause the trim actuator 20 to maintain the trim angle at the current value without changing the trim angle.

When the ECU 31 continuously determines that the water surface is not smooth and, in this state, the trim down operation is performed on the trim button 41, it is not necessary to validate the automatic trim up prohibition for prohibiting the deflector 17 from being moved to the third up position U3. That is, even if the invalidation condition for invalidating the automatic trim up prohibition is not satisfied after the deflector 17 is moved from the third up position U3 to the second up position U2 according to the trim down operation, the ECU 31 may automatically move the deflector 17 to the third up position U3.

The ECU 31 may perform only one of the first smooth water determination operation for determining, based on the detection value of the capsize sensor 39, whether or not the water surface is smooth and the second smooth water determination operation for determining, based on the detection value of the engine speed sensor 35, whether or not the water surface is smooth. The ECU 31 may determine, based on the detection value of the capsize sensor 39 and the detection value of the engine speed sensor 35, whether or not the water surface is smooth. The ECU 31 may determine whether or not the water surface is smooth in consideration of the detection value of a sensor other than the capsize sensor 39 and the engine speed sensor 35.

If the watercraft speed is not lower than the lower limit speed and lower than a predetermined intermediate speed, the ECU 31 may finally determine that the water surface is not smooth when it is determined, at least in the second smooth water determination operation, that the water surface is not smooth. When the watercraft speed falls within an intermediate speed range, a smaller magnitude of impact is vertically applied to the hull 3 even in the rough waves and the ON/OFF sensor such as the capsize sensor 39 is less liable to be turned on and off than when the watercraft speed falls within a higher speed range. Even in this case, the ECU 31 is able to more correctly determine whether or not the water surface is smooth by prioritizing the second smooth water determination operation when the watercraft speed is not lower than the lower limit speed and lower than the intermediate speed.

If the watercraft speed is not lower than the intermediate speed, the ECU 31 may finally determine that the water surface is not smooth when it is determined, at least in the first smooth water determination operation, that the water surface is not smooth. The rotation speed of the engine 10 is often fluctuated due to factors other than the wave conditions. The fluctuation tends to be increased as the rotation speed of the engine 10 increases. Further, even if the water resistance applied to the engine 10 is reduced, it is often impossible to increase the rotation speed of the engine 10 to an intended value due to a limitation on the maximum rotation speed. Therefore, when the watercraft speed is not lower than the intermediate speed, the ECU 31 is able to more correctly determine whether or not the water surface is smooth by prioritizing the first smooth water determination operation.

The ECU 31 does not determine that the water surface is not smooth when it is determined, in at least one of the first smooth water determination operation and the second smooth water determination operation, that the water surface is not smooth, but may determine that the water surface is smooth when it is determined, in at least one of the first smooth water determination operation and the second smooth water determination operation, that the water surface is smooth. In this case, the ECU 31 may determine that the water surface is not smooth when it is determined, in both of the first smooth water determination operation and the second smooth water determination operation, that the water surface is not smooth.

When it is determined that the watercraft speed is lower than the lower limit speed, the ECU 31 does not determine that the water surface is smooth without consideration of whether or not the actual water surface is smooth, but may determine, based on at least one of the detection value of the capsize sensor 39 and the detection value of the engine speed sensor 35, whether or not the water surface is smooth.

If it is possible to discriminate between the change in the rotation speed of the engine 10 due to the operation of the acceleration operator 7 and the change in the rotation speed of the engine 10 due to the wave conditions, the ECU 31 may omit the constant speed traveling determination operation for determining whether or not the watercraft 1 continuously travels forward at a constant speed.

The ON/OFF sensor may be a sensor other than the capsize sensor 39 as long as the sensor is turned on and off according to the vertical acceleration of the hull 3.

The ECU 31 may change the settings of the watercraft 1 other than the trim angle of the deflector 17 depending upon the result of the determination on whether or not the water surface is smooth. For example, when the ECU 31 determines that the water surface is not smooth, the ECU 31 may set the maximum speed of the watercraft 1 at a lower value than when the ECU 31 determines that the water surface is smooth. This suppresses the water splash occurring when the watercraft 1 travels forward.

The watercraft 1 may have two or more of the above-described features in combination.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A watercraft comprising:

a hull;

an engine to generate power to propel the hull;

an engine speed sensor to detect a rotation speed of the engine;

an ON/OFF sensor to be turned on and off such that the ON/OFF sensor is switched from one of ON and OFF states to the other of the ON and OFF states according to a vertical acceleration of the hull; and a controller configured or programmed to determine, based on at least one of a detection value of the ON/OFF sensor and a detection value of the engine speed sensor, whether or not a water surface is smooth; wherein the controller is configured or programmed to determine whether a speed of the watercraft is not lower than a lower limit speed and, if it is determined that the watercraft speed is lower than the lower limit speed, determine that the water surface is smooth.

2. The watercraft according to claim 1, the controller is configured or programmed to perform a first smooth water determination operation to determine, based on the detection value of the ON/OFF sensor, whether or not the water surface is smooth, and perform a second smooth water determination operation to determine, based on the detection value of the engine speed sensor, whether or not the water surface is smooth; and the controller is configured or programmed to:

determine that the water surface is not smooth when it is determined, in at least one of the first smooth water determination operation and the second smooth water determination operation, that the water surface is not smooth; and determine that the water surface is smooth when it is determined, in both of the first smooth water determination operation and the second smooth water determination operation, that the water surface is smooth.

3. The watercraft according to claim 1, further comprising:

an acceleration operator movable in a range from a minimum output position to a maximum output position and to be operated when an output of the engine is to be changed; and an acceleration operator position sensor to detect a position of the acceleration operator; wherein the controller is configured or programmed to determine, based on a detection value of the acceleration operator position sensor, whether or not the acceleration operator is held within a constant speed traveling range between the maximum output position and the minimum output position, and determine, based on the detection value of the engine speed sensor, whether or not the water surface is smooth when it is determined that the acceleration operator is held within the constant speed traveling range.

4. The watercraft according to claim 3, wherein the controller is configured or programmed to determine that the water surface is smooth when it is determined that the acceleration operator is not held within the constant speed traveling range.

5. The watercraft according to claim 3, wherein the controller is configured or programmed to increase a width of the constant speed traveling range as the rotation speed of the engine increases.

6. The watercraft according to claim 1, wherein the controller is configured or programmed to determine whether or not the water surface is smooth based on whether or not a number of ON/OFF times in which the ON/OFF sensor is reciprocally switched between the ON and OFF states exceeds an upper limit value within a predetermined period of time.

7. The watercraft according to claim 1, wherein the controller is configured or programmed to calculate a change rate of the rotation speed of the engine based on the detection value of the engine speed sensor, and determine, based on the calculated change rate, whether or not the water surface is smooth.

8. The watercraft according to claim 7, wherein the controller is configured or programmed to determine whether or not the water surface is smooth based on whether or not the change rate of the rotation speed of the engine is maintained within a normal traveling range, and increase a width of the normal traveling range as the rotation speed of the engine increases.

9. The watercraft according to claim 1, wherein the ON/OFF sensor includes a capsize sensor to be turned on and off according to the vertical acceleration of the hull, and switched from one of the ON and OFF states to the other of the ON and OFF states when the hull is capsized.

10. A watercraft comprising:

a hull;

a prime motor to generate power to propel the hull;

an ON/OFF sensor to be turned on and off such that the ON/OFF sensor is switched from one of ON and OFF states to the other of the ON and OFF states according to a vertical acceleration of the hull; and a controller configured or programmed to determine, based on a detection value of the ON/OFF sensor, whether or not a water surface is smooth; wherein the controller is configured or programmed to determine whether a speed of the watercraft is not lower than a lower limit speed and, if it is determined that the watercraft speed is lower than the lower limit speed, determine that the water surface is smooth.

11. A watercraft comprising:

a hull;

an engine to generate power to propel the hull;

an engine speed sensor to detect a rotation speed of the engine; and a controller configured or programmed to determine, based on a detection value of the engine speed sensor, whether or not a water surface is smooth; wherein the controller is configured or programmed to determine whether a speed of the watercraft is not lower than a lower limit speed and, if it is determined that the watercraft speed is lower than the lower limit speed, determine that the water surface is smooth.

* * * * *